(12) United States Patent
Ito et al.

(10) Patent No.: US 7,386,130 B2
(45) Date of Patent: Jun. 10, 2008

(54) ENCRYPTION SECURED AGAINST DPA

(75) Inventors: Koichi Ito, Kawasaki (JP); Masahiko Takenaka, Kawasaki (JP); Naoya Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 10/028,265

(22) Filed: Dec. 28, 2001

(65) Prior Publication Data
US 2003/0048903 A1 Mar. 13, 2003

(30) Foreign Application Priority Data
Jun. 13, 2001 (JP) ............................. 2001-178407

(51) Int. Cl.
*H04L 9/00* (2006.01)
*H04K 1/00* (2006.01)

(52) U.S. Cl. .................. 380/263; 380/28; 380/207; 713/189

(58) Field of Classification Search ................ 380/263, 380/207, 42; 726/34, 36; 326/8
See application file for complete search history.

(56) References Cited

U.S. PATENT DOCUMENTS

| | | | |
|---|---|---|---|
| 5,452,358 A | | 9/1995 | Normile et al. |
| 6,275,586 B1* | | 8/2001 | Kelly ........................ 380/46 |
| 6,295,606 B1* | | 9/2001 | Messerges et al. ......... 713/189 |
| 6,654,884 B2* | | 11/2003 | Jaffe et al. .................. 713/168 |
| 6,820,814 B1* | | 11/2004 | Benoit ........................ 235/487 |
| 6,839,847 B1* | | 1/2005 | Ohki et al. .................. 713/194 |
| 6,873,706 B1* | | 3/2005 | Miyazaki et al. ............. 380/30 |
| 7,000,111 B1* | | 2/2006 | Dent et al. .................. 713/174 |
| 2001/0048742 A1* | | 12/2001 | Handschuh .................. 380/30 |
| 2001/0053220 A1* | | 12/2001 | Kocher et al. ................ 380/29 |
| 2004/0025032 A1* | | 2/2004 | Chow et al. ................ 713/189 |
| 2004/0030905 A1* | | 2/2004 | Chow et al. ................ 713/189 |

FOREIGN PATENT DOCUMENTS

EP 0 792 041 A2 8/1997

(Continued)

OTHER PUBLICATIONS

Device (defined), Dictionary.com retrieved online <URL:http://dictionary.reference.com/search?q=device>, pp. 1-3.*

(Continued)

*Primary Examiner*—Kambiz Zand
*Assistant Examiner*—Thomas Szymanski
(74) *Attorney, Agent, or Firm*—Staas & Halsey LLP

(57) ABSTRACT

The encryption device includes a random number generator for generating a random number; and a first selector for selecting one of q fixed values in response to the random number, a second selector for selecting one set of q sets of fixed S-box tables in response to the random number. An XOR XORs an input with an XOR of a key with the fixed value. A nonlinear transform transforms an input nonlinearly in accordance with the selected set of fixed S-box tables. Another encryption device includes a plurality of encrypting units coupled in parallel, and a selector for selecting one of the plurality of encrypting units in response to the random number. The masking with the fixed values improves the processing speed and reduces the required RAM area.

25 Claims, 21 Drawing Sheets

FOREIGN PATENT DOCUMENTS

| | | |
|---|---|---|
| EP | 0 981 223 A2 | 2/2000 |
| JP | 2000-305453 | 11/2000 |
| WO | WO99/67919 | 12/1999 |
| WO | WO 00/24155 | 4/2000 |
| WO | WO 00/24156 | 4/2000 |
| WO | WO 00/27068 | 5/2000 |
| WO | WO 00/46953 | 8/2000 |
| WO | WO 00/49765 | 8/2000 |
| WO | WO 01/10077 | 2/2001 |

OTHER PUBLICATIONS

Messerges, Thomas S., "Securing the AES Finalists Against Power Analysis Attacks", Proceedings of Fast Software Encryption Workshop 2000, Apr. 10-20, 2000, pp. 150-164.

Kocker, Paul, et al., "Differential Power Analysis" in *Proceedings of Advances in Cryptology-CRYPTO '99*, Springer-Verlag 1999. pp. 388-397.

Messerges, Thomas, et al., "Power Analysis Attacks of Modular Exponentiation in Smartcards", *Cryptographic Hardware and Embedded Systems* (CHES '99), Springer-Verlag, pp. 144-157.

Akkar, Mehdi-Laurent, et al., "Power Analysis, What is Now Possible . . . ", *ASIACRYPT 2000*, pp. 489-502.

Messerges, Thomas S., "Securing the AES Finalists Against Power Analysis Attacks", *Proceedings of Fast Software Encryption Workshop 2000*, Springer-Verlag, Apr. 2000, which is called "a masking method".

Messerges, Thomas S. et al., "Investigations of Power Analysis Attacks on Smartcards", *Proceedings of USENIX Workshop on Smartcard Technology*, Mar. 1999.

Chari, Suresh, et al., "A Cautionary Note Regarding Evaluation of AES Candidates on Smart-Cards", *Second Advanced Encryption Standard Candidate Conference*, Mar. 1999.

FIPS 46, "Data Encryption Standard" Federal Information Processing Standards Publication 46, U.S. Departement of Commerce/ National Bureau of Standards, National Technical Information Service, Springfield, VA, 1977.

http://csrc.nist.gove/encryption/aes/rijndael/Rijndael.pdf (which is linked from http://www.nist.gov/aes/).

\* cited by examiner

Key XOR in Random Mask Value Method $$wi'_i(x) = w_j(x \oplus ri_j) \oplus roi_j$$

Conventional Rijndael Encryption

Generation of Sub-keys in Rijndael Encryption

Subbyte

Sboxgen Generates Sbox, $S_{i,j}$, such that $S_{i,j}(x) = S(x \oplus Rin_{i,j}) \oplus Rout_{i,j}$ NewSbox

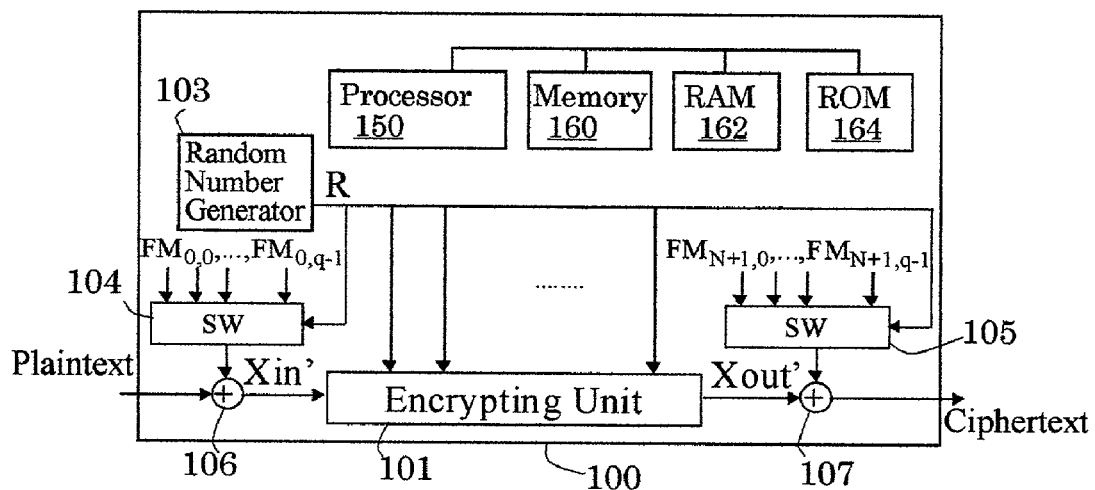
FIG. 21
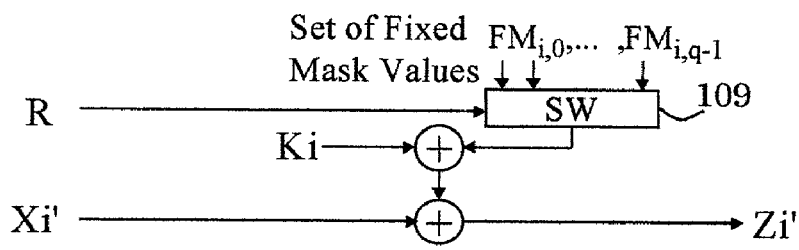
FIG. 22  Key XOR
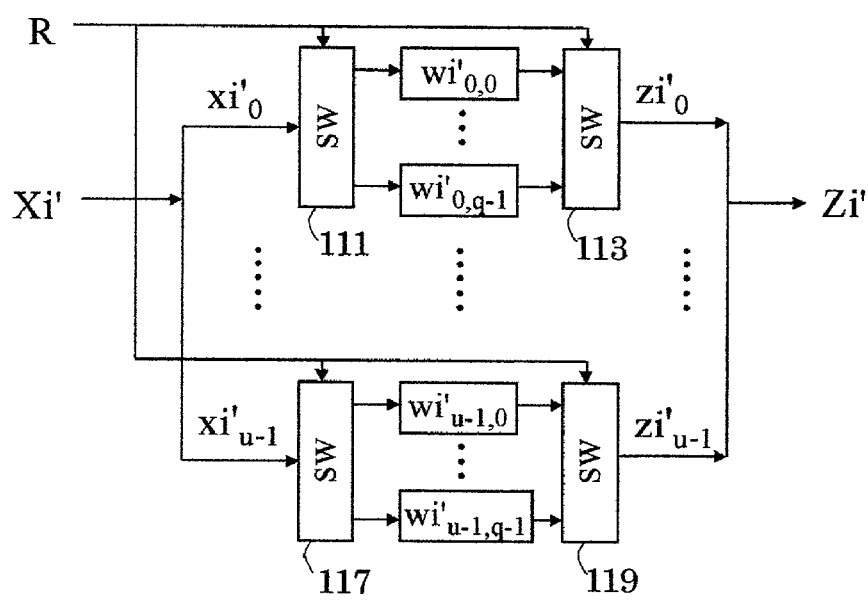
FIG. 23  Nonlinear Transform

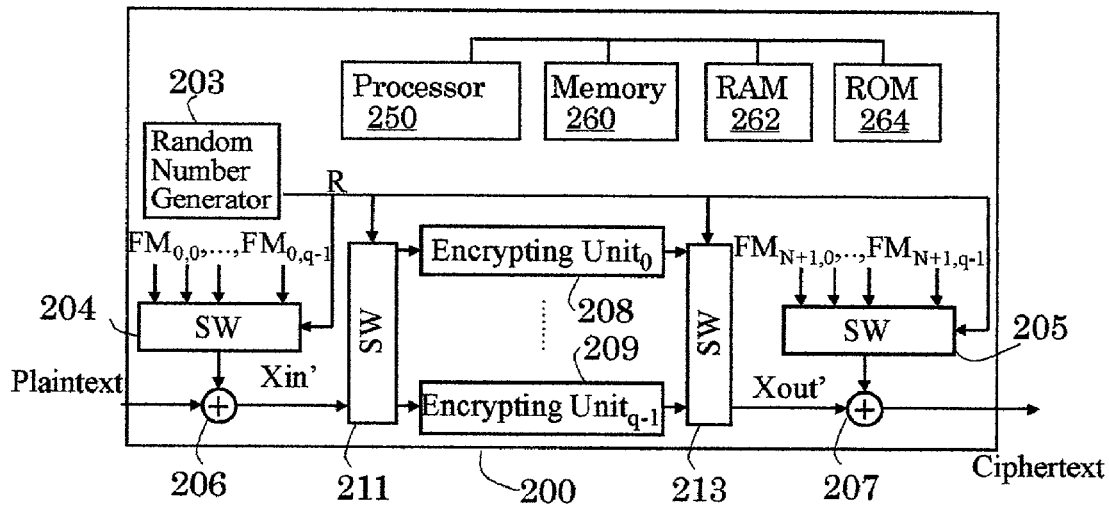
FIG. 24
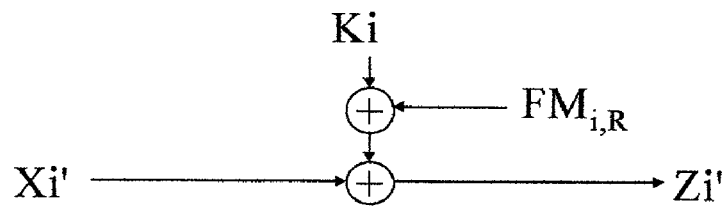
Key XOR
FIG. 25
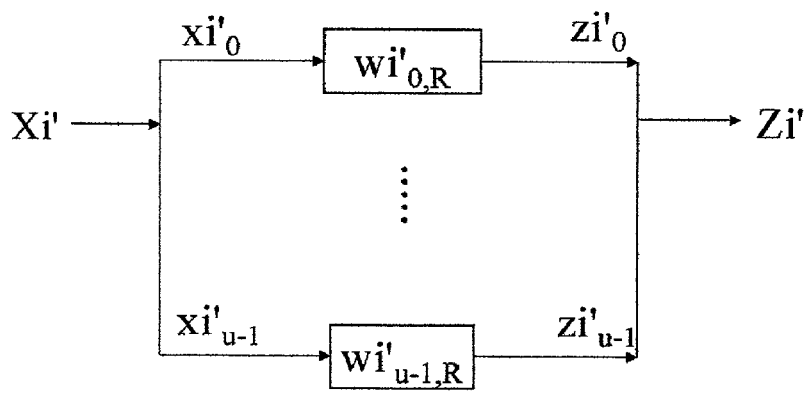
FIG. 26    Nonlinear Transform $S_{i,j,h}(x) = S(x \oplus c_{i,j,h}) \oplus d_{i,j,h}$ S(x): Sbox in Conventional Rijndael Process Subbyte $S_{j,h}(x) = S(x \oplus c_{h,j}) \oplus d_{h,j}$ (j=0,..,15)

(S(x): Sbox in Conventional Rijndael Process)

Subbyte

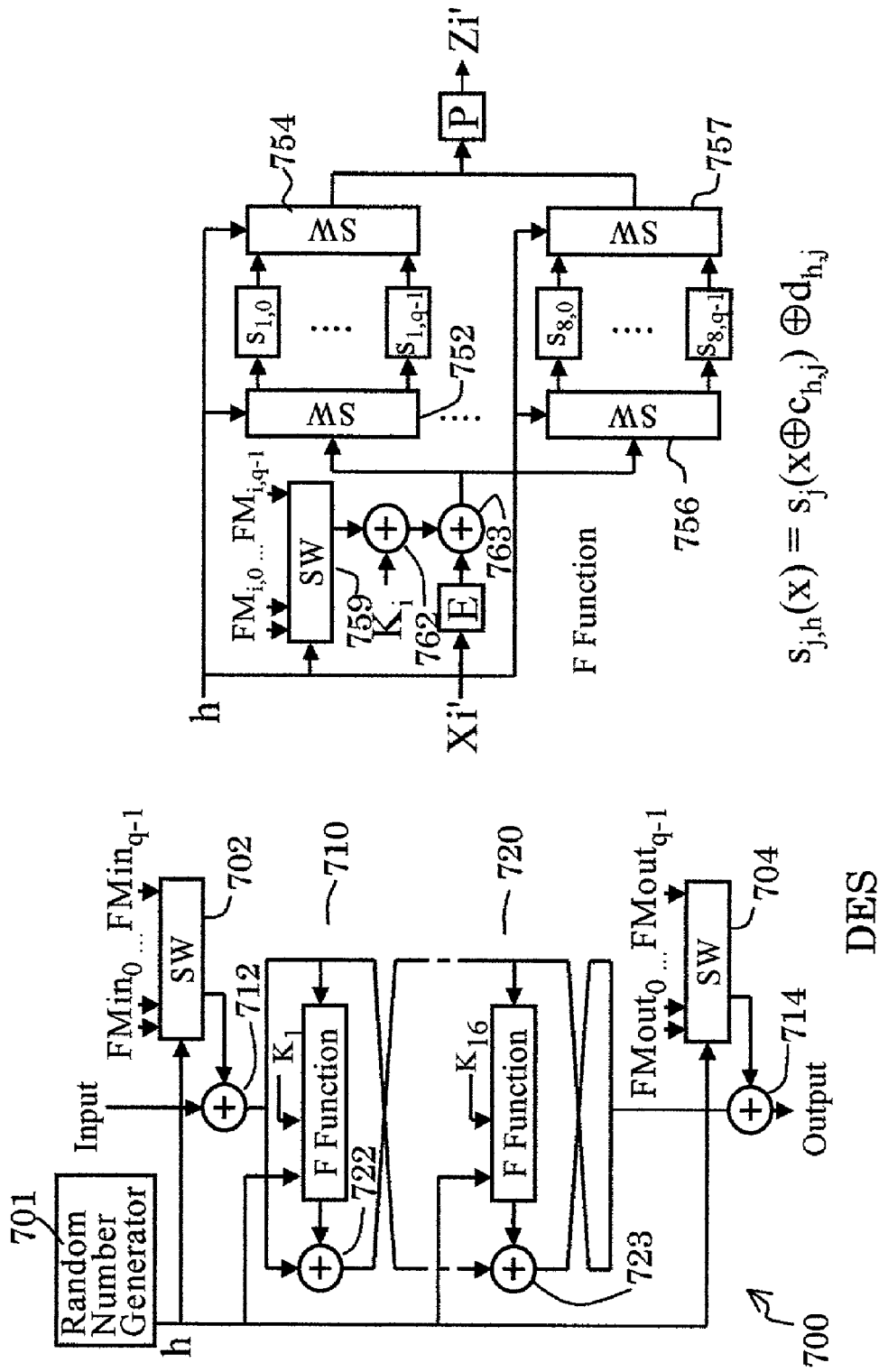

Propagation of Mask in Feistel Encryption

Paths from Mask Value Generation to Cancellation in Feistel Encryption Device

ENCRYPTION SECURED AGAINST DPA

FIELD OF THE INVENTION

The present invention relates to an information encrypting process, and in particular to a security technique of the encryption against analysis for decryption generally called a power analysis attack.

BACKGROUND OF THE INVENTION

An encryption system generally includes a public key cryptosystem and a common key cryptosystem. The common key cryptosystem uses the same secret key for both of encryption and decryption. Ciphertext can be securely transmitted by allowing the secret key to be shared between a user of a transmitter and a user of a receiver and by keeping the key secret from others. FIG. 1 shows an example of encryption with a common secret key in a smart card 10. In FIG. 1, the smart card 10 encrypts input plaintext with a common secret key in its encryption unit, in a well known manner, to provide ciphertext.

Analysis for decryption estimates secret information including a secret key from available information such as ciphertext and the like. A power analysis attack which is one way of the analysis for decryption is described in Paul Kocher, Joshua Jaffe, and Benjamin Jun, "Differential Power Analysis" in proceedings of Advances in Cryptology-CRYPTO'99, Springer-Verlag, 1999, pp. 388-397. The power analysis attack collects and analyses dissipated electric power data when different input data is provided to an on-board encryption processor of a device, such as a smart card, to estimate the key information in the encryption processor. This power analysis attack can be applied to both of the public key encryption and the secret key encryption.

The power analysis attack includes a simple power analysis (SPA) and a differential power analysis (DPA). The SPA estimates a secret key from the characteristics of a set of dissipated electric power data in the encryption processor. The DPA estimates a secret key by analyzing the differences between a number of sets of power data. Generally, the DPA is powerful.

For example, the DPA for the public key encryption such as the RSA and the like is described in Thomas S. Messerges, Ezzy A. Dabbish and Robert H. Sloan "Power Analysis Attacks of Modular Exponentitiation in Smartcards" Cryptographic Hardware and Embedded Systems (CHES'99), Springer-Verlag, pp. 144-157. The SPA and DPA for the DES (data encryption standard) which is the current standard of the common key cryptosystem are described in Paul Kocher, Joshua Jaffe, and Benjamin Jun, "Differential Power Analysis", in proceedings of Advances in Cryptology-CRYPTO'99, Springer-Verlag, 1999, pp. 388-397. The DPA against the Rijndael method which can be a new standard of the common key cryptosystem is described in, for example, S. Chari, C. Jutla, J. R. Rao, P. Rohatgi, "An Cautionary Note Regarding Evaluation of AES Candidates on Smart-Cards", Second Advanced Encryption Standard Candidate Conference, March 1999.

Thus, the DPA generates an interest as a particularly effective method for the power analysis attack, and different DPA methods for secret key analysis have been developed. On the other hand, techniques for protection against the DPA for secret key analysis have been developed.

Described below is a conventional typical configuration for the common key encryption to which the DPA can be applied. FIGS. 2, 3, and 4 show a key XOR (exclusive OR), a linear transform and a nonlinear transform, respectively, which are operations used in the typical common key encryption.

In FIG. 2, the key XOR provides a resultant output Zi of XORing input data Xi with key information Ki. (The operator "XOR" is represented by a symbol of a combination of "○" and "+" in the attached drawings and mathematical formulas and equations herein.) In FIG. 3, the linear transform L provides a linear transformed output Zi=L(Xi) for input data Xi, where L(x XOR y)=L(x) XOR L(y) for arbitrary x and y. The linear transform includes bit permutation, a matrix operation and the like. In FIG. 4, the nonlinear transform W nonlinearly transforms the input data Xi to provide an output Zi=W(Xi), where W(x XOR y)≠W(x) XOR W(y) for arbitrary x and y. A typical nonlinear transform often employs nonlinear transform table SBoxes, divides an input X into the number, u, of elements as $X=\{x_{u-1}, \ldots x_1, x_0\}$ (where u is a natural number), uses Sboxes, $w_i$'s (i=0, 1, . . . u), to perform each operation $z_i=w_i(x_i)$, and produces an output Z as a combined value $Z=(z_{u-1} \ldots z_1\ z_0)$.

In the typical common key encryption, each round function is configured by an appropriate combination of these key XOR, linear transform and nonlinear transform, and the round function is sequentially repeated for a plurality of rounds.

Described below is the technique of analysis for decryption in accordance with the DPA. The DPA includes a step of measuring dissipated power data and a step of analyzing a key based on the difference of dissipated power data. In measuring the dissipated power data, input plaintext containing a sequence of different codes is serially provided to an encryption device such as a smart card and the like, and change of dissipated electric power with time in its encryption processor in response to the input plaintext is measured by using an oscilloscope and the like, to thereby obtain a dissipated power curve. FIG. 7A shows an example of such a dissipated power curve. The measuring is performed for different plaintext inputs to collect a statistically sufficient number of dissipated power curves. A set G is defined herein as a set of dissipated power curves obtained by the measurement.

Described below is the analysis of a key using the dissipated power curves. FIG. 5 shows an example of encryption which is formed by a combination of the key XOR (FIG. 2) and the nonlinear transform (FIG. 4) in series connection. The DPA for the encryption is described below. FIG. 6 shows elements relevant to an arbitrary nonlinear transform element $w_i$ shown in FIG. 5. In FIG. 6, a value $m_i$ indicates a known multi-bit value within arbitrary input plaintext, a value $k_i$ (an element in $K=\{k_{u-1}, \ldots k_1, k_0\}$) indicates an element value of an unknown key K, a function $w_i$ indicates an element transform function in a known SBox table, and a value $z_i(=w_i(m_i\ \text{XOR}\ k_i))$ indicates an output. For the DPA, the element value of the key used in the processor is assumed as an arbitrary value $k_1'$. An operation $z_i'=w_i(m_i\ \text{XOR}\ k_i')$ is performed in accordance with the known $m_i$ and $w_i$, and the assumed $k_i'$, and the set $G(k_i')$ for the assumed $k_i'$ is divided into the following subsets $G_0(k_i')$ and $G_1(k_i')$.

$$G_0(k_i')=\{G|\ \text{an}\ e\text{-th bit value in}\ z_i'=w_i(m_i \oplus k_i')\ \text{is}\ 0\} \quad (1),$$

$$G_1(k_i')=\{G|\ \text{an}\ e\text{-th bit value in}\ z_i'=w_i(m_i \oplus k_i')\ \text{is}\ 1\} \quad (2),$$

where "e" is a natural number indicating the e-th least significant bit.

Then, the following difference $DG(k_i')$ between the dissipated power curves for the assumed $k_i'$ is generated.

$DG(k_i')$=(average dissipated power curve $\in G_1$)−(average dissipated power curve $\in G_0$)     (3)

FIG. 7A shows an example of an average dissipated power curve obtained from the dissipated power curves which belong to the set $G_1$. FIG. 7B shows an example of an average dissipated power curve obtained from the dissipated power curves which belong to $G_0$. If a value of the assumed key element is equal to a value of a corresponding true key element, i.e. $k_i'=k_i$, then a spike appears in the difference dissipated power curve as shown in FIG. 7C which represents the difference between the curves of FIG. 7A and FIG. 7B. If a value of the assumed key element is not equal to a value of a corresponding true key element, i.e. $k_i' \neq k_i$, then the difference dissipated power curve as shown in FIG. 7D which represents the difference between the curves of FIG. 7A and FIG. 7B becomes a generally flat curve. Therefore, the key $k_i$ can be estimated from the difference dissipated power curve with the spike which is generated in accordance with the assumed $k_i'$. By generating the difference dissipated power curves for the $k_i$ for all i's, the key K can be successfully analyzed or ultimately determined.

How a spike appears in the power difference curve $DG(k_i')$ in the case of $k_i'=k_i$ as a phenomenon is described below. If $k_i'=k_i$, then the assumed $z_i'=w_i(m_i \text{ XOR } k_i')$ matches with a corresponding actual $z_i=w_i(m_i \text{ XOR } k_i)$ in the processor for all $m_i$'s. Thus, when the set $G(k_i')$ is divided into the subsets $G_0(k_i')$ and $G_1(k_i')$ in accordance with the equations (1) and (2), the following equation (4) can be obtained using the Hamming weight HW of $z_i$, where the Hamming weight is defined as the number of bits having a value of one in a binary value which represents a certain numerical value. For example, the Hamming weight HW of a binary 4-bit value $(1101)_2$ is 3.

(averaged HW of $z_i$'s for $z_i \in G_1$)−(averaged HW of $z_i$'s for $z_i \in G_0$)=1     (4)

On the other hand, if $k_i' \neq k_i$, the assumed $z_i'=w_i(m_i \text{ XOR } k_i')$ has no correlation with the corresponding actual $z_i=w_i(m_i \text{ XOR } k_i)$ in the processor. Thus, even if the set $G(k_i')$ for all $m_i$'s is divided into the subsets $G_0(k_i')$ and $G_1(k_i')$ in accordance with the equations (1) and (2) for the assumed $z_i'$, it is actually divided into the two subsets at random for the respective actual $z_i$'s (i.e., the actual $z_i$ which has been assumed as $z_i'$), and the following equation (5) is established.

(average HW of $z_i$'s for $z_i \in G_1$)−(average HW of $z_i$'s for $z_i \in G_0$)≈0     (5)

When the equation (4) is established, there is a significant difference in average Hamming weights of the load values $z_i$'s between $G_0(k_i')$ and $G_1(k_i')$. When the equation (5) is established, there is no significant difference in average Hamming weights of the load values, $z_i$'s, between $G_0(k_i')$ and $G_1(k_i')$.

The transform $w_i$ represented by $z_i=w_i(x_i)$ is performed by reading in the output value $z_i$ of the transform table SBox from a memory such as a ROM, a RAM and the like within the encryption device in accordance with a load instruction. It is generally assumed that, the power proportional to the Hamming weight of a load value may be dissipated when the load instruction is executed. An experimental result showing the relevancy of the assumption is described in T. S. Messerge, Ezzy A. Dabbish and Robert H. Sloan, "Investigations of Power Attacks on Smartcards", Proceedings of USENIX Workshop on Smartcard Technology, March 1999.

Thus, if $k_i'=k_i$, then the equation (4) is satisfied, and hence the significant difference of the dissipated power appears in the form of a spike in the difference power curve. In the case of the equation (5), however, the difference power curve has no spike and has a generally flat curve. It is known that the DPA can be also applied to an encryption device which has a configuration in which the linear transform L of FIG. 3 is incorporated into the device of FIG. 4.

FIG. 8 shows an encryption device having a configuration in which two linear transforms are added before and after the encryption device of FIG. 4. When $L_1$ and $L_2$ are assumed to be permutation functions and $w_i$ is assumed to be an SBox of the DES, the configuration of FIG. 8 is equivalent to the F function of the DES. For the specification of the DES, refer to FIPS 46, "Data encryption standard" Federal Information Processing Standards Publication 46, U.S. Department of Commerce/National Bureau of Standards, National Technical Information Service, Springfield, Va., 1977. The process in FIG. 8 can be converted to a process similar to the one as shown in FIG. 6, and hence the DPA can be applied to estimate a key K, similarly.

In the technique as described above, the DPA is applied to the SBox output in the process of nonlinear transform. There are further techniques of applying the DPA to a value of an XOR (an output of the key XOR) of the input $m_i$ with the key $k_i$, and to the input value $x_i$ provided to the SBox. In a particular processor, the dissipated power as expressed by the following equation (6) in the adjacent bit model can be represented by a function of bits of a load value, to thereby obtain an effective analysis. This is reported in M. Akkar, R. Bevan, P. Dischamp, and D. Moyart, "Power Analysis, What Is Now Possible . . . " Asiacrypt 2000.

$V(z)=a'+a_0z_0+a_1z_1+ \ldots +a_7z_7+a_{0,1}z_0z_1+a_{1,2}z_1z_2+ \ldots +a_{6,7}z_6z_7$     (6)

In accordance with the techniques described above, a secret key K is determined by the DPA in three cases or conditions 1-3 as described below. FIG. 9 shows measured points A, B and C for measuring the dissipated power curves in the encryption device of FIG. 5.

1. A case in which an input M is known and can be arbitrarily selected or controlled by an attacker, a key K has an unknown fixed value, and transforms of Sboxes, $w_i$'s, are known. In this case, the dissipated power curve is measured at predetermined timing at the measured point A (at the output of the SBox $w_i$) shown in FIG. 9.
2. A case in which the input M is known and controllable, and the key K has an unknown fixed value. In this case, the dissipated power curve is measured at predetermined timing at the measured point B (at the output of the key XOR) shown in FIG. 9.
3. A case in which the input M is known and controllable, and the key K has an unknown fixed value. In this case, the dissipated power curve is measured at predetermined timing at the measured point C (at the load input for indexing an SBox, $w_i$) shown in FIG. 9.

Conventional Protection Against DPA

Conventional countermeasure protection against the DPA includes, for example, a technique of reducing the measurement precision of the dissipated power by providing a noise generator in a smart card, and a technique of providing protection in an encryption algorithm. The technique of reducing the measurement precision can be easily implemented, but it is not a drastic measure because the analysis can be achieved by increasing the number of times of measurements. On the other hand, it may not be easy to provide protection in the encryption algorithm, which, however, can be a drastic measure. A typical technique of providing protection in the encryption algorithm is described in Thomas S. Messerges, "Securing the AES Finalists Against Power Analysis Attacks," in proceedings of Fast Software Encryption Workshop 2000, Springer-Verlag, April 2000, which is called "a masking method". The masking method performs each of encryption processes on a value M' expressed by M'=M XOR R for an input value M and a random number R as a mask rather than on the input value M per se. Since the random number R is generated for each process of encryption, this method is referred to as a "random mask value method" hereinafter.

Described below is the random mask value method. FIG. 10 shows a schematic block diagram of the process in accordance with the random mask value method. This process includes an upper encrypting unit, a lower mask value generating unit, and a random number generator as shown in the figure.

When the conventional encrypting process in which the conventional key XOR function, the linear function, and the nonlinear function as shown in FIGS. 2, 3 and 4 are used is changed to the encrypting process shown in FIG. 10, they are replaced with a key XOR function, a linear function, and a nonlinear function as shown in FIGS. 11, 12 and 13A, respectively, in accordance with the random mask value method.

In the random mask value method, the computation of the conventional intermediate data $X_i$ in the encryption is replaced with the computation of the $X_i'$ and the random number $R_i$ which satisfy the exclusive OR, $X_i=X_i'$ XOR $R_i$. The encrypting unit computes $X_i'$, and the mask value generating unit computes $R_i$. The following equations (7) are established for $X_i$, $X_i'$, $Z_i$, $Z_i'$, $R_i$, and $RO_i$ in the operations shown in FIGS. 2 and 11, FIGS. 3 and 12, and FIGS. 4 and 13A.

$$\begin{cases} Xi = Xi' \oplus Ri \\ Zi = Zi' \oplus ROi \end{cases} \quad (7)$$

In FIG. 2, the XOR operation, $Z_i=X_i$ XOR $K_i$, is performed on the input value $X_i$ with the key $K_i$. On the other hand, in FIG. 11, after the random number $RK_i$ is generated by the random number generator in the encrypting process, the double XOR operation, $Z_i'=X_i'$ XOR $K_i$ XOR $RK_i$, is performed on the input value $X_i'$ and the key $K_i$. The XOR operation, $RO_i=R_i$ XOR $RK_i$, is performed on the $R_i$ with $RK_i$ in the mask value generating process.

In FIG. 3, the linear transform, $Z_i=L(X_i)$, is performed. On the other hand, the transform, $Z_i'=L(X_i')$, is performed in the encrypting process shown in FIG. 12, and the transform, $RO_i=L(R_i)$, is performed in the mask value generating process.

In FIG. 4, a nonlinear transform is performed using the number, u, of SBoxes expressed by $w_1, w_2, \ldots w_{u-1}$. In the encrypting process shown in FIG. 13A, a new set of SBoxes expressed by $wi'_1, wi'_2, \ldots wi'_{u-1}$ are generated and stored in the RAM area by the process using a NewSBox unit, as shown in FIG. 13A, and a nonlinear transform is performed using these new SBoxes. In the mask value generating process shown in FIG. 13A, the process is performed using the NewSBox unit, and each of $w'_1, w'_2, \ldots w'_{u-1}$ is generated in accordance with the $R_i$ and the internally generated random number $RO_i$, to provide outputs $w'_1, w'_2, \ldots w'_{u-1}$ and $RO_i$. FIG. 13B shows a detailed configuration of the NewSBox unit. The NewSBox generates $RO_i$ in accordance with the internal random number generator, generates $wi'_j$ for $j=0, 1, \ldots u-1$ which satisfies $wi'_j(x)=w(x$ XOR $ri_j)$ XOR $roi_j$, in accordance with $R_i=ri_{u-1} \ldots ri_1 ri_0$, $RO_i=roi_{u-1} \ldots roi_1 roi_0$, and the SBoxes, $w_1, w_2, \ldots w_{u-1}$, used in FIG. 13B, to provide outputs ROi and $wi'_j$.

Described briefly below is the security of the random mask value method. In the random mask value method, the Sbox, wi', of FIGS. 13A and 13B in each round shown in FIG. 10 and in FIG. 19 as described later changes in accordance with a random number. Thus, the content of the SBox can not be known by the DPA. That is, since the condition of the case 1 above that the SBox is known is not satisfied, the dissipated power curves measured at the predetermined timing at the measured point A shown in FIG. 8 can not be divided into G0 and G1 in accordance with the equations (1) and (2). Thus, the encryption device employing the random mask value method is secure against the DPA. Similarly, with respect to the conditions of the cases 2 and 3 above, the random element which changes each time in the measuring is combined at the measured point B at the output of the key XOR function and at the measured point C at the input to an Sbox. Thus, the condition that the key K is fixed is not satisfied. Thus it is secure against the DPA.

Described below is the Rijndael method as an example of the encryption employing the random mask value method. FIG. 14 shows a general configuration of a conventional N-round Rijndael type process without protection against the DPA. Each round of the N-round Rijndael process contains operations of an XOR, a Subbyte (substitute byte), a Shift or shifter and a Mixed column. The last round includes another XOR, but does not include a Mixedcolumn. In FIG. 14, the number N is determined in accordance with the number of bits of the secret key Ksec. If the Ksec has 128 bits, N is determined to be 10 (N=10). If it has 192 bits, N is determined to be 12 (N=12). If it has 256 bits, N is determined to be 14 (N=14). $K_i$ is called a sub-key. FIG. 15 shows a sub-key generator for generating N+1 128-bit sub-keys, $K_0, K_1, \ldots K_N$, from 128/192/256-bit secret key Ksec in the Rijndael method. The method for generating sub-keys from a secret key is described in the specification of the Rijndael method accessible at http://www.nist.gov/aes/.

FIG. 16 shows a configuration of the Subbyte. This process performs a 128-bit-to-128-bit nonlinear transform using S's, each of which represents an 8-bit-to-8-bit transform SBox. FIG. 17 shows a configuration of the Shift. This process rearranges or reshuffles bytes in terms of byte positions. FIG. 18 shows a configuration of the Mixedcolumn. This process performs an operation in a matrix over the field GF ($2^8$).

FIG. 19 illustrates the N-round Rijndael method employing the random mask value method as opposed to the conventional N-round Rijndael method illustrated in FIG. 14. The N-round Rijndael method illustrated in FIG. 19 includes an upper N-round encryption unit, a lower N-round mask value generation unit, and a random number generator, as shown. $K_i$ represents the sub-key of the i-th round in the Rijndael method. $RK_i$ represents a random mask value for each sub-key. The Subbyte performs a 128-bit-to-128-bit nonlinear transform using sixteen Sboxes, $S_{i,0}, S_{i,1}, \ldots S_{i,15}$, in the form as shown in FIG. 16. $S_{i,0}, S_{i,1}, \ldots S_{i,15}$ represent SBoxes generated by a new SBox unit "NewSBox" in the i-th round. FIG. 20 shows a configuration of the NewSBox, which generates sixteen different Sboxes, $S_{i,0}(x), S_{i,1}(x), \ldots S_{i,15}(x)$, in response to an input value $Rin_i$ in accordance with the internally generated random number $Rout_i$, to provide the random number $Rout_i$. The Shift and Mixedcolumn are linear transforms shown in FIGS. 17 and 18, similarly to those used in the process of the conventional Rijndael method.

The flow of the process of FIG. 19 is described below in Steps [1101] to [1109] for the encryption unit, and Steps [1201] to [1209] for the mask value generation unit as follows:

[1101] Set i=0.
[1102] Generate a random mask value Rin, and XOR the plaintext with Rin.
[1103] XOR the operated plaintext with ($K_i$ XOR $RK_i$). Provide a mask value $RK_i$ to the mask value generation to generate sixteen SBoxes: $S_{i,j}(x)$ (j=0, 1, . . . 15).
[1104] Perform the Subbyte on it, using the $S_{i,j}(x)$ generated at Step [1103].
[1105] Perform the Shift and Mixedcolumn on it.
[1106] i:=i+1
[1107] If i<N−1, then return to Step [1103]. Otherwise, proceed to the next step.
[1108] XOR it with $K_{N-1}$, and provide $RK_{N-1}$ to the mask value generation to generate sixteen SBoxes: $S_{N-1,j}(X)$ (j=0, 1, . . . 15).
[1109] Perform the Subbyte using $S_{N-1,j}(x)$, the Shift, and the XOR with $K_N$ on it.
[1110] XOR the operation output from Step [1109] with the output Rout from the mask value generation, and a resultant ciphertext is provided as an ultimate output.

The flow of the mask value generation:
[1201] Set i=0 and Mask=Rin, where Rin is a random mask value generated at Step [1102].
[1202] Perform the operation of Mask XOR $RK_i$ on the $RK_i$ received from the encryption, to generate a new Mask.
[1203] Produce sixteen Sboxes, $S_{i,j}(x)$ (j=0, 1, . . . 15), and the random number $Rout_i$, by providing the new Mask generated at Step [1202] to the NewSBox, to set $Rout_i$ as a new Mask. The $S_{i,j}(x)$ is used in the Subbyte in the i-th round of the encryption.
[1204] The Mask is provided to the Shift and Mixed column, and the output from these operations is set to be a new Mask.
[1205] Set i:=i+1. If i<N−1, then return to Step [1202].
[1206] Perform the operation of Mask XOR $RK_{N-1}$ on the input $RK_{N-1}$ from the encryption. Then, set the operated result to be a new Mask.
[1207] By providing $Rin_{N-1}$ to the NewSBox, produce sixteen Sboxes, $S_{N-1,j}(x)$ (j=0, 1, . . . 15), and a random number $Rout_{N-1}$. Then, set $Rout_{N-1}$ to be a new Mask. $S_{N-1,j}(x)$ is used in the Subbyte in the (N−1)th round of the encryption.
[1208] Provide the Mask to the Shift. Then, the operated result is set to be a new Mask.
[1209] Perform the operation of Mask XOR $RK_N$ on the input $RK_N$ provided from the encryption, and provide the XOR output to thereby end the process.

Although it is known that the random mask value method has high security against the DPA, the encryption employing the random mask value method has drawbacks in that its encrypting speed is a few tenths lower than that of the conventional encryption and it requires a very large RAM area.

The encrypting speed is low as described above, because, in the XOR for example in the encrypting process, two intermediate values x and y are used to perform the operation z=x XOR y in the conventional implementation, while it is necessary in the random mask value method to derive the intermediate values x' and y' satisfying x'=x XOR $R_x$ and y'=y XOR $R_y$ to perform the operation z'=x' XOR y', and to perform the additional operation $R_z = R_x$ XOR $R_y$ for generating the new mask value related to the z'. For the nonlinear transform, nonlinear transform tables, called Sboxes, are held in a ROM in the conventional method, while nonlinear transform tables must be generated each time in accordance with a new mask value in the random mask value method, which requires a large amount of computations.

A large RAM area is required as described above, because, for the conventional nonlinear transform, the new Sboxes are stored in the RAM in each encryption process in the random mask value method, while the nonlinear transform tables are held in the ROM in the conventional method. For example, in the Rijndael method which uses an SBox for 8-bit-to-8-bit transform, a RAM area of at least $2^8=256$ bytes is required to implement the random mask value method as protection against the DPA. However, for example, since a chip for a low cost smart card, such as an ST 16 (manufactured by ST Microelectron) has a RAM area of only about 128 bytes, it is practically impossible to implement the random mask value method.

It has been proposed to provide improvement of an apparent processing speed, reduction of the required RAM area and the like, by sharing mask values and by generating mask values between an encrypting process and the next encrypting process. However, since the masking with a random value is first performed in the entire process, it is impossible to achieve the improvement of the processing speed of the entire process and the reduction of the required RAM area.

The present inventors have recognized that it is advantageous to improve the processing speed and reduce the required RAM area by performing the masking with fixed values rather than the random values. The masking method using the fixed values is hereinafter referred to as a fixed mask value method.

An object of the present invention is to provide efficient protection of an encryption processor for encrypting data with a common key from analysis for decryption.

Another object of the present invention is to make it difficult to estimate a secret key, and to raise the security of the encryption processor.

SUMMARY OF THE INVENTION

In accordance with one aspect of the present invention, an encryption device includes XOR means and nonlinear transform means. The encryption device further includes random number generator means for generating a random number; q fixed values, where q is an integer; and a first selector for selecting one of the q fixed values in response to the random number. The XOR means XORs an input thereto with an XOR of a key with the selected fixed value.

In accordance with another aspect of the invention, an encryption device includes XOR means and nonlinear transform means. The encryption device further includes random number generator means for generating a random number; q sets of masked fixed tables, where q is an integer; and a selector for selecting one of the q sets of fixed tables in response to the random number. The nonlinear transform means nonlinearly transforms an input thereto in accordance with the selected set of fixed tables.

In accordance with a further aspect of the invention, an encryption device includes random number generator means for generating a random number; a plurality of encrypting units coupled in parallel; and a selector for selecting one of the plurality of encrypting units in response to the random number. Each of the plurality of encrypting units includes XOR means and nonlinear transform means.

In accordance with a still further aspect of the invention, an encryption device includes random number generator means for generating a random number and a plurality of encrypting rounds. Each of the plurality of encrypting rounds includes nonlinear transform means for nonlinearly transforming an input, and XOR means for XORing a first input with a second input. The second input of the XOR means is coupled to an output of the nonlinear transform means. The nonlinear transform means includes q fixed values, where q is an integer; a selector for selecting one of the q fixed values in response to the random number; and further XOR means for XORing an input with an XOR of a key with said selected fixed value.

In accordance with a still further aspect of the invention, an encryption device includes random number generator means for generating a random number; a plurality of encrypting units coupled in parallel; and a selector for selecting one of the plurality of encrypting units in response to the random number. Each of the encrypting units includes a plurality of encrypting rounds. Each of the encrypting rounds includes nonlinear transform means for nonlinearly transforming an input; and XOR means for XORing a first input with a second input. The second input to the XOR means is coupled to an output of the nonlinear transform means.

In accordance with a still further aspect of the invention, a program (which may be stored on a storage medium) for use in an encryption device is operable to effect the step of selecting one of a plurality of encryption processes in response to a random number, and the step of encrypting an input value in accordance with the selected encryption process to provide an output. The encrypting step includes the step of XORing an input value with an XOR of a key with a fixed value, and the step of nonlinear transforming an input value in accordance with a set of fixed tables.

According to the invention, an encryption processor for encrypting data using a common key is efficiently protected from analysis for the secret key, estimation of a secret key becomes difficult, and the security of the encryption processor can be enhanced.

According to an embodiment of the invention, a plurality of fixed values are prepared and switched for selection using a random value in accordance with the fixed mask value method of the invention to thereby obtain effects similar to the conventional random mask value method, while the conventional method masks an input or a key using random values. In the fixed mask value method, the mask values are limited to specific fixed values. Thus, the processing speed can be improved by predetermining the mask values. In addition, the method can be implemented on a platform having a small RAM area, by preparing a set of fixed mask values and by preparing nonlinear transform tables associated with respective fixed mask values in a ROM. For example, since an LSI chip for a low cost smart card such as the ST 16 and the like has a large ROM area of about 6 K bytes, the fixed mask value method is suitable for the low cost smart card.

BRIEF DESCRIPTION OF THE DRAWINGS

FIG. 21 shows a schematic configuration of a first type of encryption device in accordance with the invention;

FIG. 22 shows a configuration of a key XOR used in the device of FIG. 21;

FIG. 23 shows a configuration of a nonlinear transform used in the device of FIG. 21;

FIG. 24 shows a schematic configuration of a second type of encryption device in accordance with the invention;

FIG. 25 shows a configuration of a key XOR used in the device in FIG. 24;

FIG. 26 shows a configuration of a nonlinear transform used in the device in FIG. 24;

FIGS. 33A and 33B show a configuration of the Feistel DES employing the fixed mask value method shown in FIG. 29;

DESCRIPTION OF THE PREFERRED EMBODIMENTS

Figure 1:
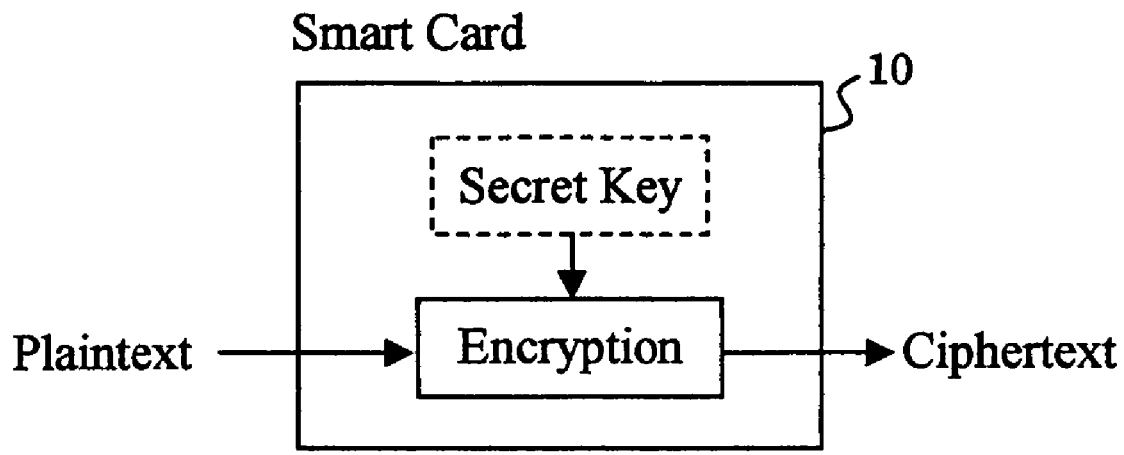
FIG. 1 shows an example of an encryption process with a common secret key in a smart card.

Embodiments of the present invention are described below. In the embodiments, all or parts of elements and processes in the encryption may be implemented in the form of hardware such as an integrated circuit and the like, or in the form of a program executed by a processor.

FIG. 21 shows a schematic configuration of a first type of encryption device 100 in accordance with the present invention. FIGS. 22 and 23 show configurations of a key XOR and a nonlinear transform, respectively, in the encryption device 100. The linear transform in the device may be the one shown in FIG. 2.

In FIG. 21, the encryption device 100 includes a random number generator 103 for generating a random number R (R=0, 1, . . . , q−1), a switch unit or a selector 104 for selecting one of fixed mask values, $FM_{0,R}$, in response to the random number to provide the selected value, an XOR 106 for XORing input plaintext with the selected fixed mask value, $FM_{0,R}$ (Xin'=plaintext XOR $FM_{0,R}$), an encrypting unit 101 for receiving an input Xin' and encrypting the received input Xin' in accordance with the random number R to provide an output Xout', a switch unit 105 for selecting one of the fixed mask values, $FM_{N+1,R}$, in response to the random number to provide the selected value, and an XOR 107 for XORing the output Xout' with the selected fixed mask value $FM_{N+1,R}$ to produce ciphertext (Xout' XOR $FM_{N+1,R}$), where q represents the number of sets of fixed mask values used in the encrypting unit 101 and N represents the number of rounds.

The encryption device 100 further includes RAM 162 for working memory, ROM 164 for storing fixed mask values, fixed nonlinear transform table SBoxes, linear transform functions L's and the like, and a processor 150 for controlling the processing elements 103 to 107 in accordance with the program stored in a program memory 160 such as a ROM. Alternatively, the processor 150 may provide the processing elements 103 to 107 thereon, by executing the program in the memory 160 which is implemented to provide the functions corresponding to the processing elements 103 to 107. In this case, FIG. 21 may be considered as a flow diagram.

Figure 2:
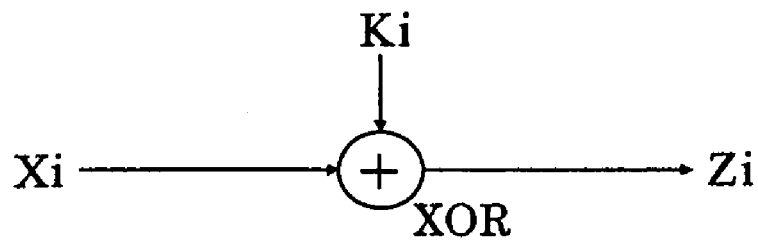
FIG. 2 shows a key XOR used in typical common key encryption.
Figure 3:
FIG. 3 shows a linear transform used in typical common key encryption.
Figure 4:
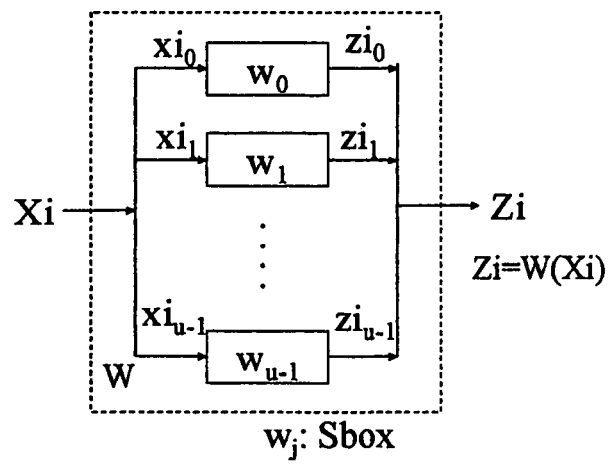
FIG. 4 shows a nonlinear transform used in typical common key encryption.
Figure 5:
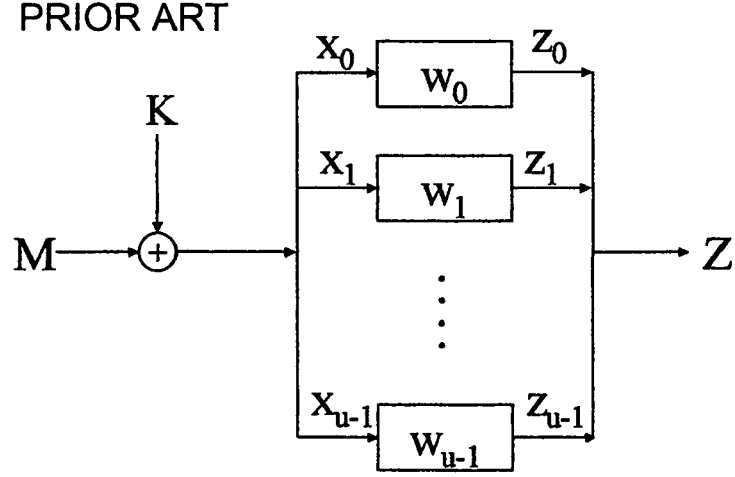
FIG. 5 shows an example of encryption performed by a combination of the key XOR (FIG. 2) and the nonlinear transform (FIG. 4) in series connection.
Figure 6:
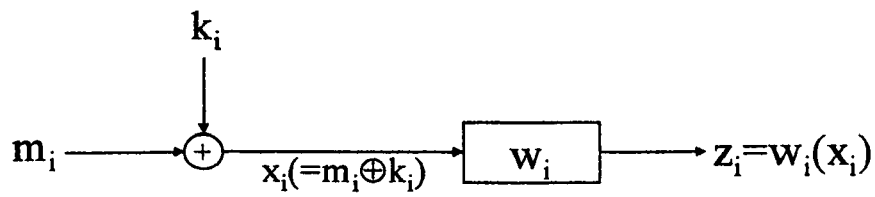
FIG. 6 shows elements related to an arbitrary nonlinear transform element wi shown in FIG. 5.
Figure 7A:
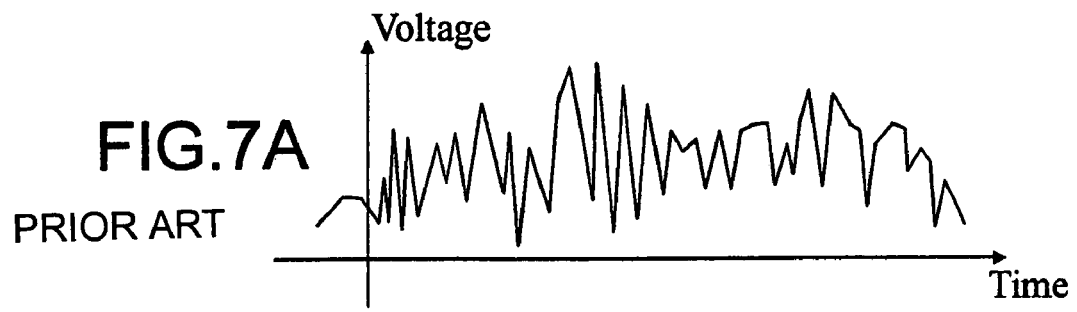
FIGS. 7A and 7B show dissipated power curves representative of change of the electric dissipated power with time in an encryption processor in response to input plaintext into the processor.
Figure 7B:
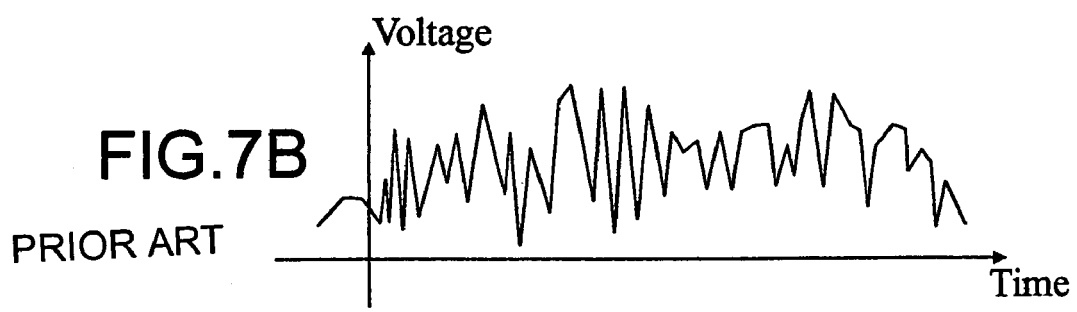
Figure 7C:
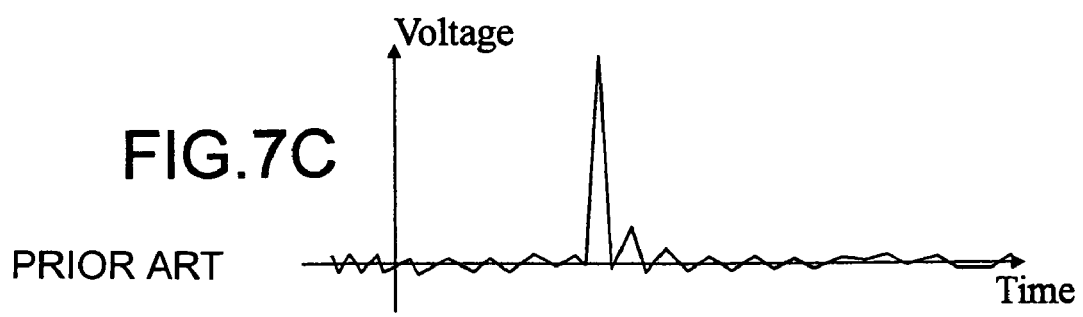
FIG. 7C shows difference between the dissipated power curves, which has a spike.
Figure 7D:
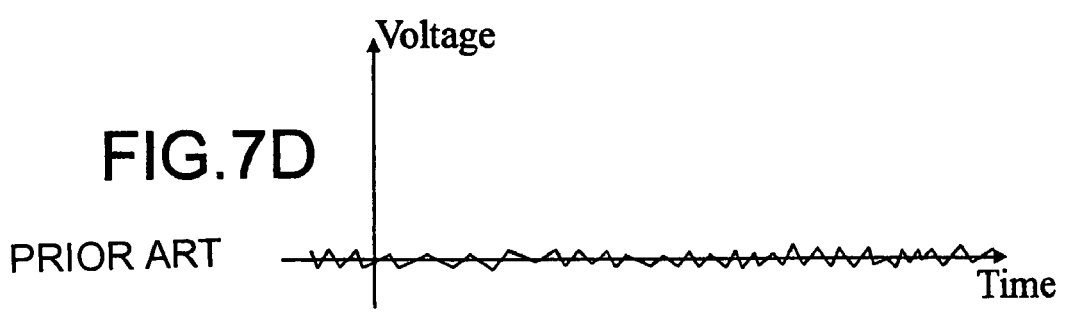
FIG. 7D shows difference between the dissipated power curves, which has no spike.
Figure 8:
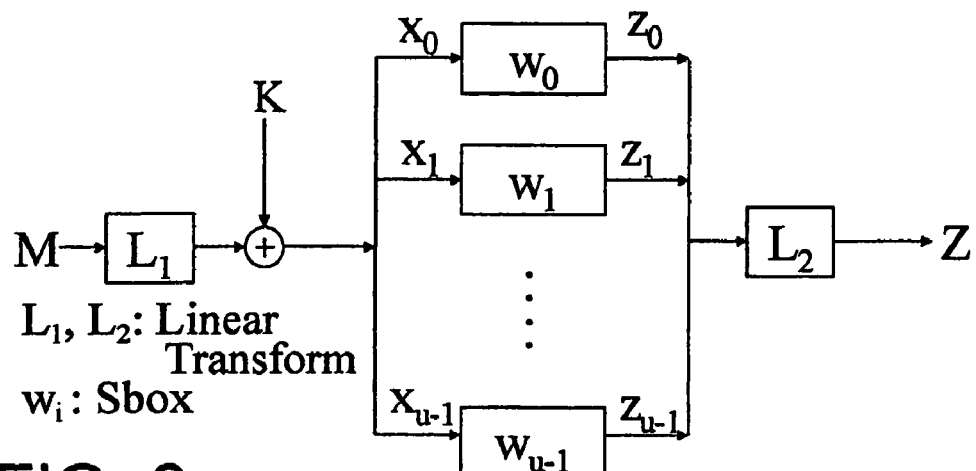
FIG. 8 shows an encryption device having a configuration in which two linear transforms are added before and after the encryption device of FIG. 4.

The encrypting unit 101 recursively executes the round function defined by a combination of a key XOR of FIG. 22, the linear transform of FIG. 2 and a nonlinear transform of FIG. 23, or executes the round function with a plurality of round function circuits in series connection, each circuit having such a combination.

The key XOR of FIG. 22 XORs the key Ki with the fixed mask value $FM_{i,R}$ selected by a switch unit 109 in response to the random number R, to provide a certain value, and XORs the input Xi' with the certain value to provide an output Zi'. The nonlinear transform of FIG. 23 selects the SBox elements $wi_{j,R}'$ (j=0, . . . u−1) in response to the random number R through switch units 111 to 119, and performs the nonlinear transform using the selected elements $wi_{j,R}'$.

Figure 11:
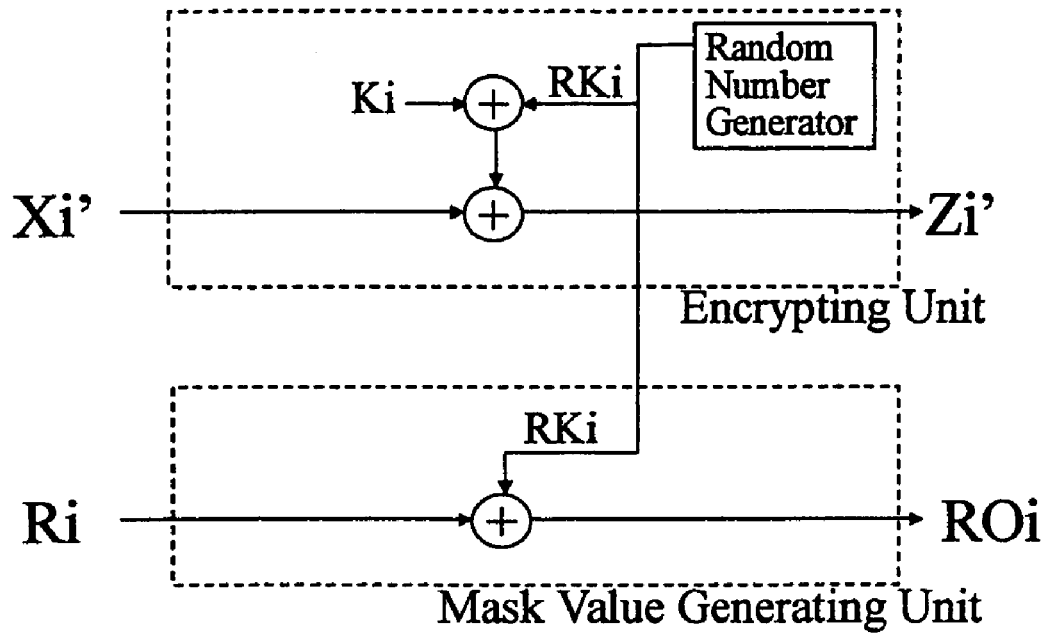
FIG. 11 shows a key XOR in accordance with the random mask value method.

Using the relation of the equations (7) in the random mask value method described above, the following equation (8) is obtained in the key XOR shown in FIG. 22, corresponding to the Ri and ROi shown in FIG. 11.

$$ROi = Ri \oplus FM_{i,R} \quad (8)$$

Figure 13A:
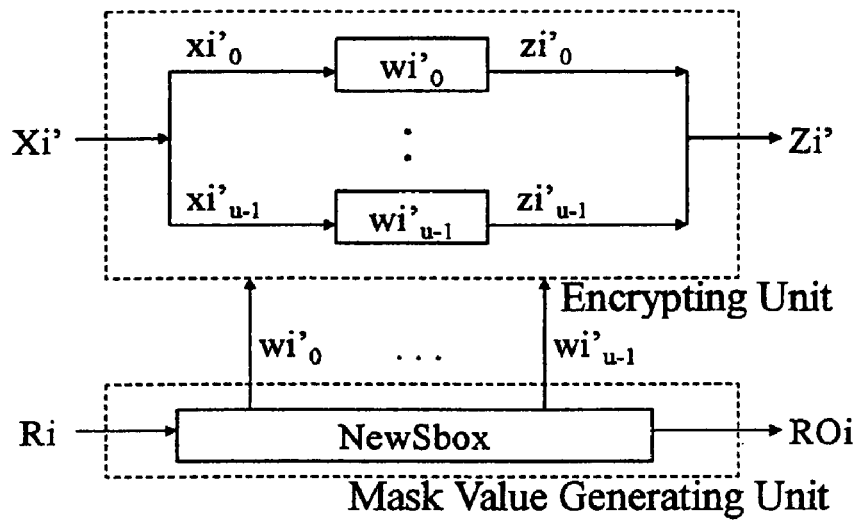
FIGS. 13A and 13B shows a nonlinear function in accordance with the random mask value method.
Figure 13B:
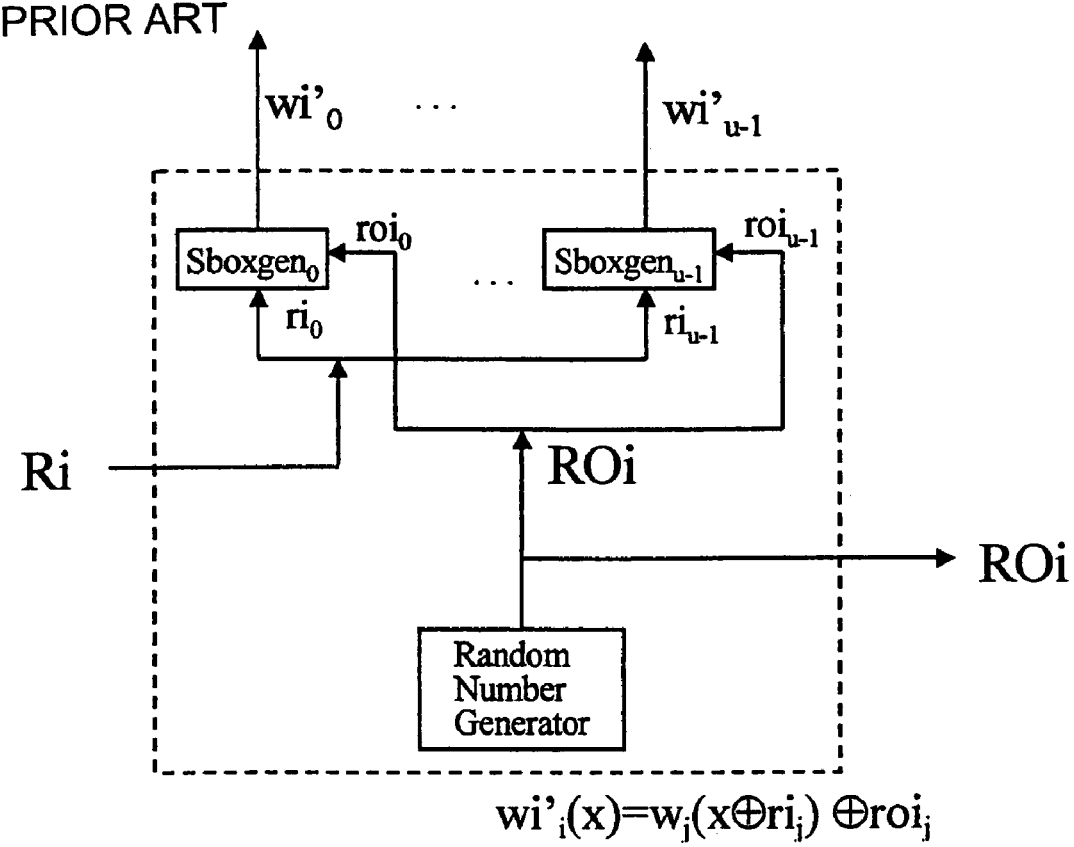
Figure 14:
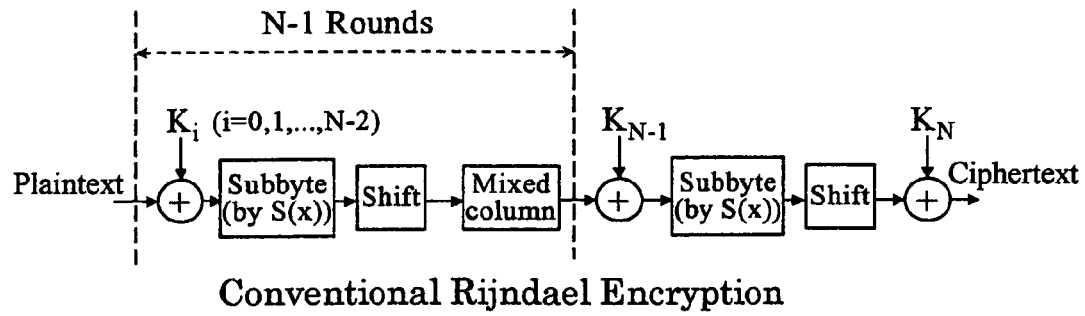
FIG. 14 shows a general configuration of a conventional N-round Rijndael process without protection against the DPA.
Figure 15:
FIG. 15 shows a sub-key generator for generating sub-keys, K0, K1, . . . KN, from a secret key Ksec in the Rijndael method.

The following equation (9) is obtained corresponding to the Ri and Roi of the NewSBox shown in FIG. 13B used in the nonlinear transform of FIG. 23.

$$wi'_{j,R}(xi') = wi(Ri \oplus xi') \oplus Roi \quad (9)$$

FIG. 24 shows a schematic configuration of a second type of encryption device 200 in accordance with the invention. FIGS. 25 and 26 show configurations of a key XOR and a nonlinear transform, respectively, in the device 200. The linear transform in each one of encrypting units may be the one shown in FIG. 2.

In FIG. 24, the encryption device 200 includes a random number generator 203 for generating a random number R (R=0, 1, . . . , q−1), a switch unit 204 for selecting one of the fixed mask values, $FM_{0,R}$, in response to the random number to provide the selected value, an XOR 206 for XORing input plaintext with the fixed mask value $FM_{0,R}$ selected by the switch unit 204 (Xin'=plaintext XOR $FM_{0,R}$), a plurality of encrypting units 208 to 209 for receiving an input Xin' and encrypting the received input Xin' to produce an output Xout', a switch unit 211 for receiving the input Xin' and selecting one of the encrypting units 208 to 209 in parallel connection in response to the random number R to provide the input Xin' to the selected encrypting unit, a switch unit 213 for selecting the same one of the encrypting units 208 to 209 in response to the same random number R to provide an output Xout' from the selected encrypting unit, a switch unit 205 for selecting one of the fixed mask values, $FM_{N+1,R}$, in response to the random number to provide the selected value, and an XOR 207 for XORing the output Xout' with the selected fixed mask value $FM_{N+1,R}$ to produce ciphertext (=Xout' XOR $FM_{N+1,R}$), where q represents the number of sets of fixed mask values to be used and N represents the number of rounds. In FIG. 24, one of the two switch units 211 and 213 may be selected, and the other may be eliminated.

The encryption device 200 further includes RAM 262 for working memory, ROM 264 for storing fixed mask values, fixed nonlinear transform table SBoxes, linear transform functions L's and the like, and a processor 250 for controlling the processing elements 203 to 211 in accordance with the program stored in a program memory 260 such as a ROM. Alternatively, the processor 250 may provide the processing elements 203 to 211 thereon, by executing the program in the memory 260 which is implemented to provide the functions corresponding to the processing elements 203 to 211. In this case, FIG. 24 may be considered as a flow diagram.

The encrypting units 208 to 209 have identical configurations except that the sets $wi_{i,j}$ of the fixed mask values $FM_{i,j}$ and the respective SBoxes are different from each other. Each of the encrypting units 208 to 209 recursively executes the round function defined by a combination of a key XOR of FIG. 25, the linear transform of FIG. 2 and a nonlinear transform of FIG. 26, or executes the round function with a plurality of round function circuits in series connection, each circuit having such a combination.

Figure 12:
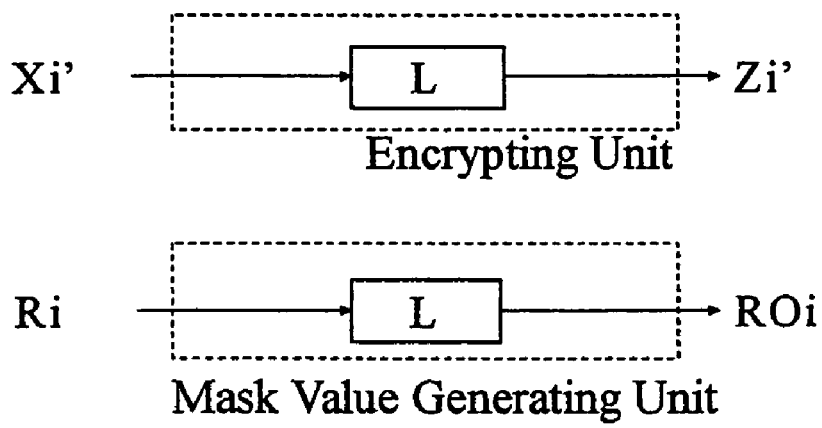
FIG. 12 shows a linear function in accordance with the random mask value method.

The key XOR of FIG. 25 XORs the key Ki with the fixed mask value $FM_{i,R}$ which is specific to each of the encrypting units 208 to 209, to provide a certain value, and XORs the input Xi' with the certain value to provide an output Zi'. The nonlinear transform of FIG. 26 performs a nonlinear transform using a set of the Sboxes, $wi_{j,R}$'s (j=0, ... u−1), which is specific to each encrypting unit. Using the relation of the equations (7) described above in connection with the random mask value method, the equation, $$ROi = Ri \oplus FM_{i,R},$$

is obtained in the key XOR shown in FIG. 25, corresponding to the Ri and ROi shown in FIG. 11. The equation, $$wi'_{j,R}(xi') = wi(Ri \oplus xi') \oplus Roi,$$

is obtained corresponding to the Ri and Roi shown in FIG. 12B in the nonlinear transform of FIG. 26.

The fixed mask value method in accordance with the invention may be suitable for implementation in the low cost smart card. Now, the following problems are taken into consideration in order to provide a more preferable implementation.

(A) Problem of the Effectiveness of the Method for Protection Against the DPA

It is known that the random mask value method is secure against the DPA, but it may be uncertain to what degree the fixed mask value method is secure. The fixed mask value method may possibly be vulnerable to the DPA depending on how it is implemented and on the condition of the fixed mask values.

(B) Problem of the Possibility of a Significant Increase of a ROM Area

The fixed mask value method is advantageous over the random mask value method in that a required RAM area can be smaller by preparing nonlinear transform tables in the ROM. However, the required size of the ROM depends on the number of the prepared fixed mask values. The required capacity of the ROM may possibly be considerably large to ensure the security.

With regard to the problem (A) above, it is found that a certain implementation of encryption in accordance with the invention is sufficiently secure as long as the fixed mask values satisfy a certain condition, even if the number, q, of fixed mask values is set to be two as small. The security of the Rijndael method employed as an encrypting method in accordance with the invention will be described later. Similarly, with respect to the problem (B), the number, q, of different fixed mask values is set to be two or so and identical or common Sboxes are used within each one round and/or for every round, to thereby keep the amount of data of the SBoxes as small as about two or several times the amount in the conventional implementation without applying the invention and keep the required amount of ROM as small. The amount of ROM used in the Rijndael method employed in accordance with the invention will be described later.

Figure 27:
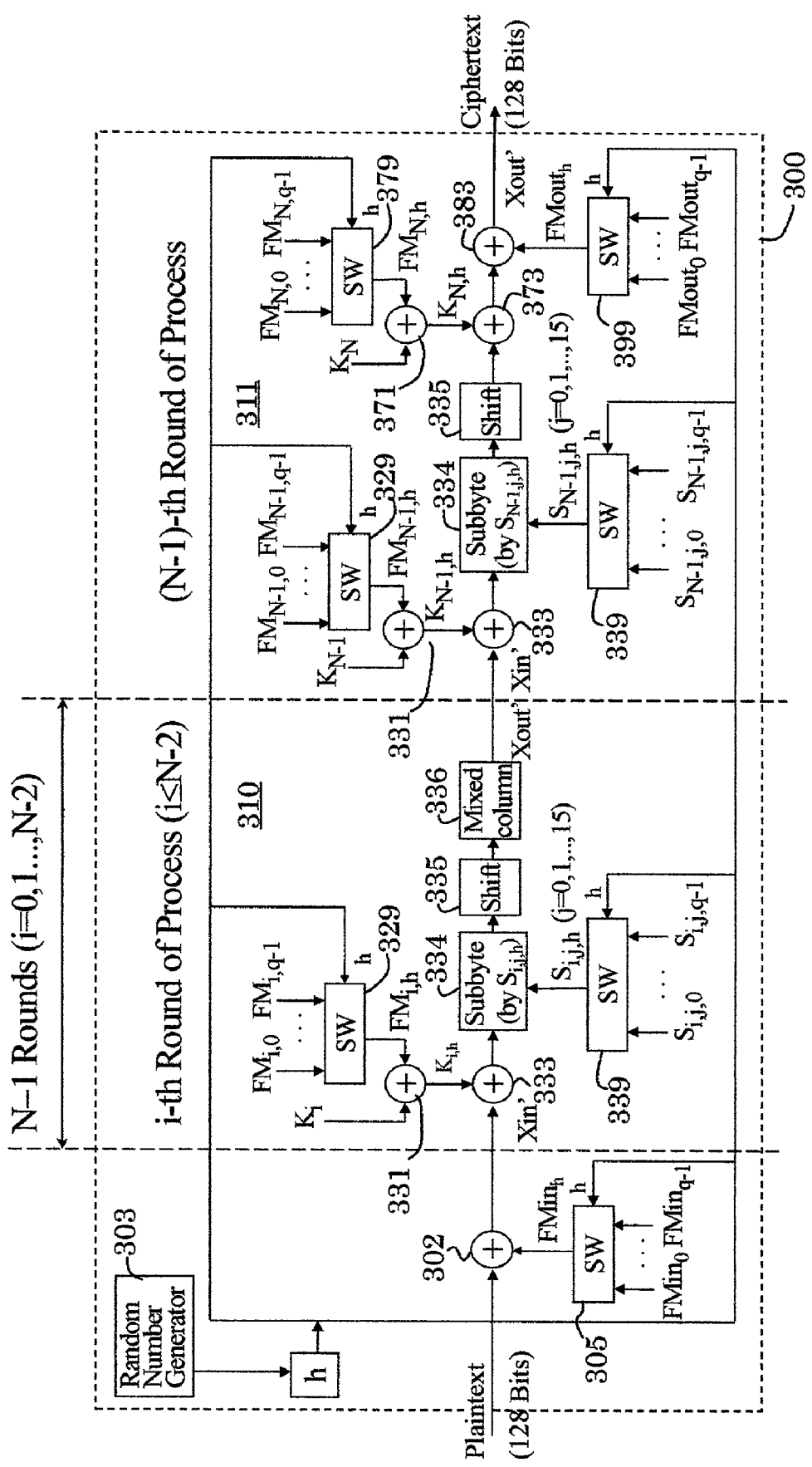
FIG. 27 shows an example of the first type of encryption device of FIG. 21.

FIG. 27 shows an example of the first type of encryption device 100 shown in FIG. 21, which is an encryption device 300 in accordance with the Rijndael method to which the fixed mask value method is applied. In FIG. 27, the processor 150, and the memories 160, 162 and 164 shown in FIG. 21 are not shown for simplicity. In FIG. 27, the encryption device 300 includes a random number generator 303 for generating a random number h (h=0, 1, ..., q−1), a selector 305 for selecting one of the fixed mask values, $FMin_h$, in response to the random number h to provide the selected value, an XOR 302 for XORing input plaintext with the selected fixed mask value $FMin_h$, a plurality of encrypting rounds 310 for receiving an input Xin' and encrypting the input Xin' in accordance with the random number h (0≤i≤N−2 for each round i) to provide an output Xout', and an (N−1)th encrypting round 311 for receiving the output Xout' from the previous (N−2)th encrypting round 310 as an input Xin' and encrypting the input in accordance with the random number R to provide ciphertext Xout'.

Each i-th round of the plurality of encrypting rounds 310 includes a selector 329 for providing a fixed mask value $FM_{i,h}$ selected in response to the random number h, an XOR 331 for XORing the key $K_i$ with the fixed mask value $FM_{i,h}$ to provide an output, an XOR 333 for XORing the input Xi' with the output value from the XOR 331, a switch unit or selector 339 for selecting one of fixed value SBoxes, $S_{i,j,h}$, (j=0, 1, ... 15), in response to the random number h to provide the selected SBox, a Subbyte 334 for subbyting the output from the XOR 333 in accordance with the selected $S_{i,j,h}$, a Shift 335 for shifting the output from the Subbyte 334, and a Mixedcolumn 336 for mixedcolumning the output from the Shift 335.

The (N−1)th encrypting round 311 includes switch units 329 and 339, XORs 331 and 333, a Subbyte 334, and a Shift 335, similarly to the i-th encrypting round 310, but includes no Mixedcolumn. The (N−1)th encrypting round 311 XORs, in an XOR 371, $K_N$ with the fixed mask value $FM_{N,h}$ selected by a switch unit 379, to generate a masked key $K_{N,h}$, then XORs, in an XOR 373, the $K_{N,h}$ with the output from the Shift 335, and then XORs, in an XOR 383, the output from the XOR 373 with the fixed mask value $FMout_h$ selected by a switch unit 399, to thereby provide ciphertext.

In this example, $FM_{i,h}$, $FMin_h$ and $FMout_h$ are fixed mask values. $S_{i,j,h}$ is a fixed SBox. The fixed mask values and the SBox values are predetermined. Thus, serial computation for the masking which is required in the conventional random mask value method is not required in the fixed mask value method. Thus, the entire process is performed at a higher speed. In addition, the predetermined fixed mask values and the SBox transform tables are stored in a ROM, for example the ROM 164 shown in FIG. 21 and the ROM 264 shown in FIG. 24, rather than a RAM, for example the RAM 162 shown in FIG. 21 and the RAM 262 shown in FIG. 24, to thereby drastically reduce the RAM area required for implementation. The reduction of the required amount of RAM is advantageous in implementation of the decryption in a low cost smart card with the RAM area of only 128 bytes.

Figure 16:
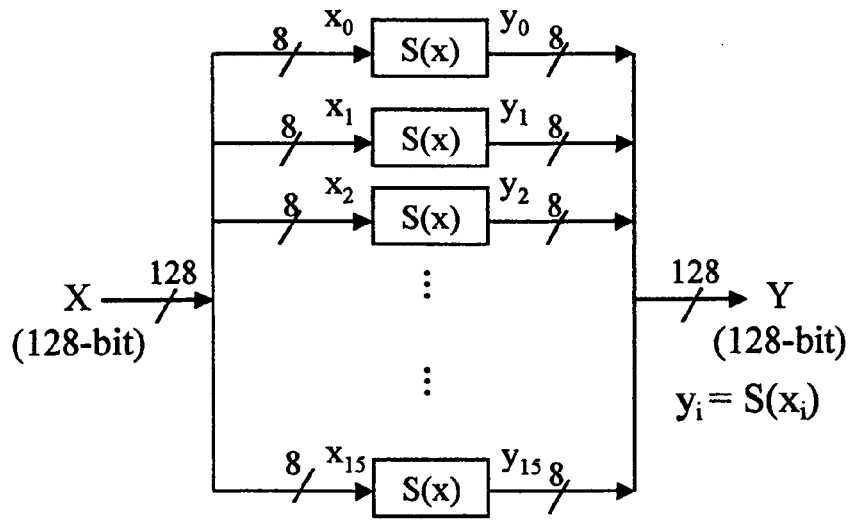
FIG. 16 shows a configuration of the Subbyte.
Figure 17:
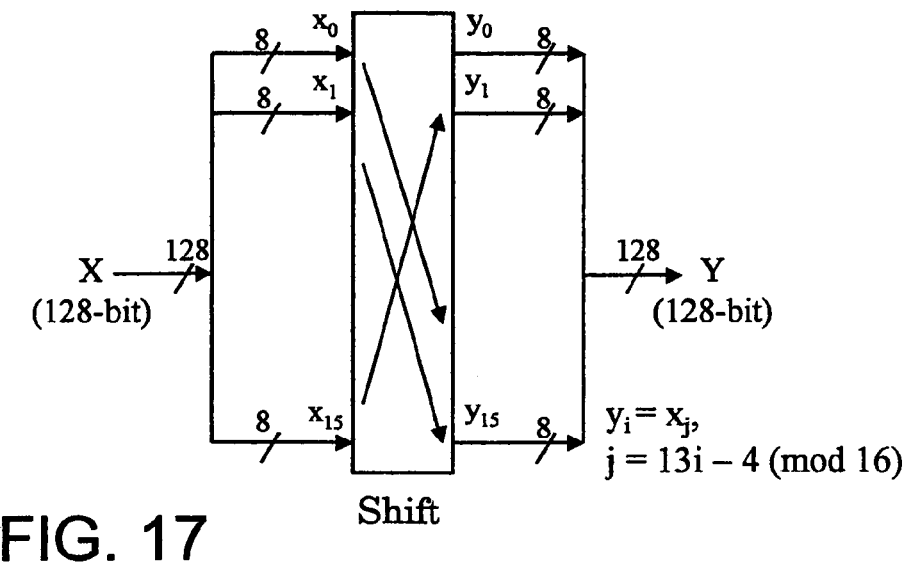
FIG. 17 shows a configuration of the Shift.
Figure 18:
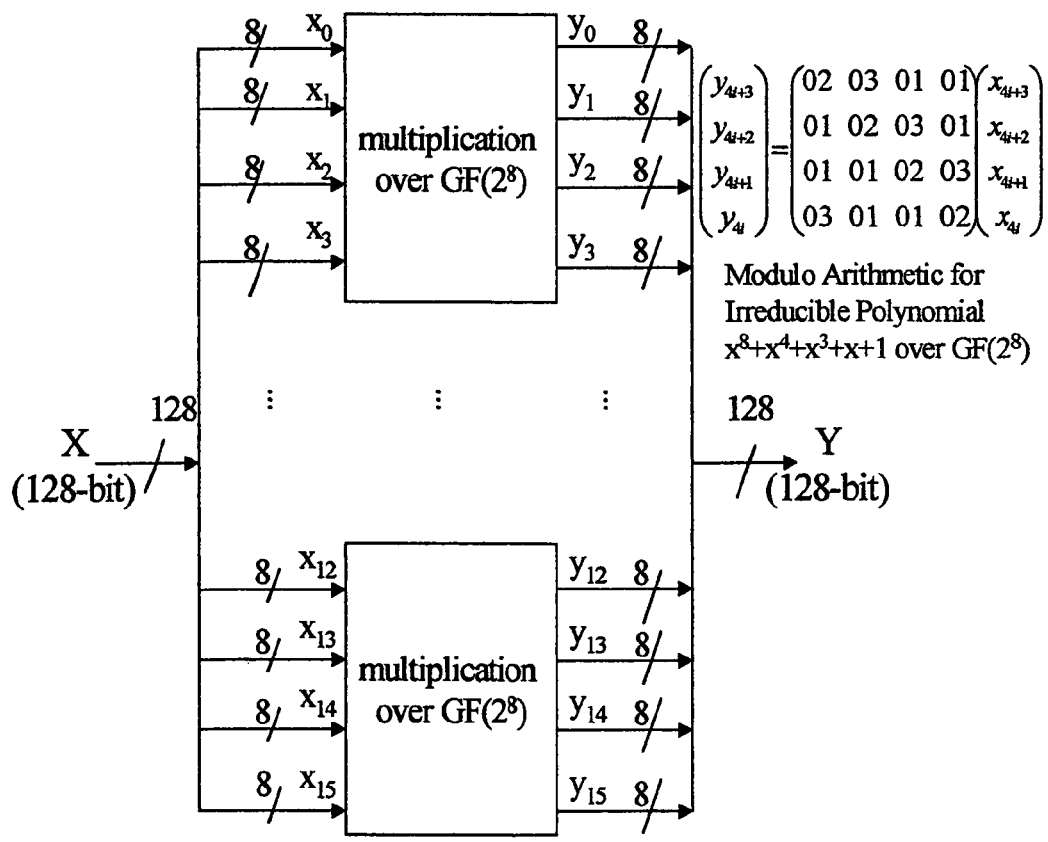
FIG. 18 shows a configuration of the Mixedcolumn.
Figure 19:
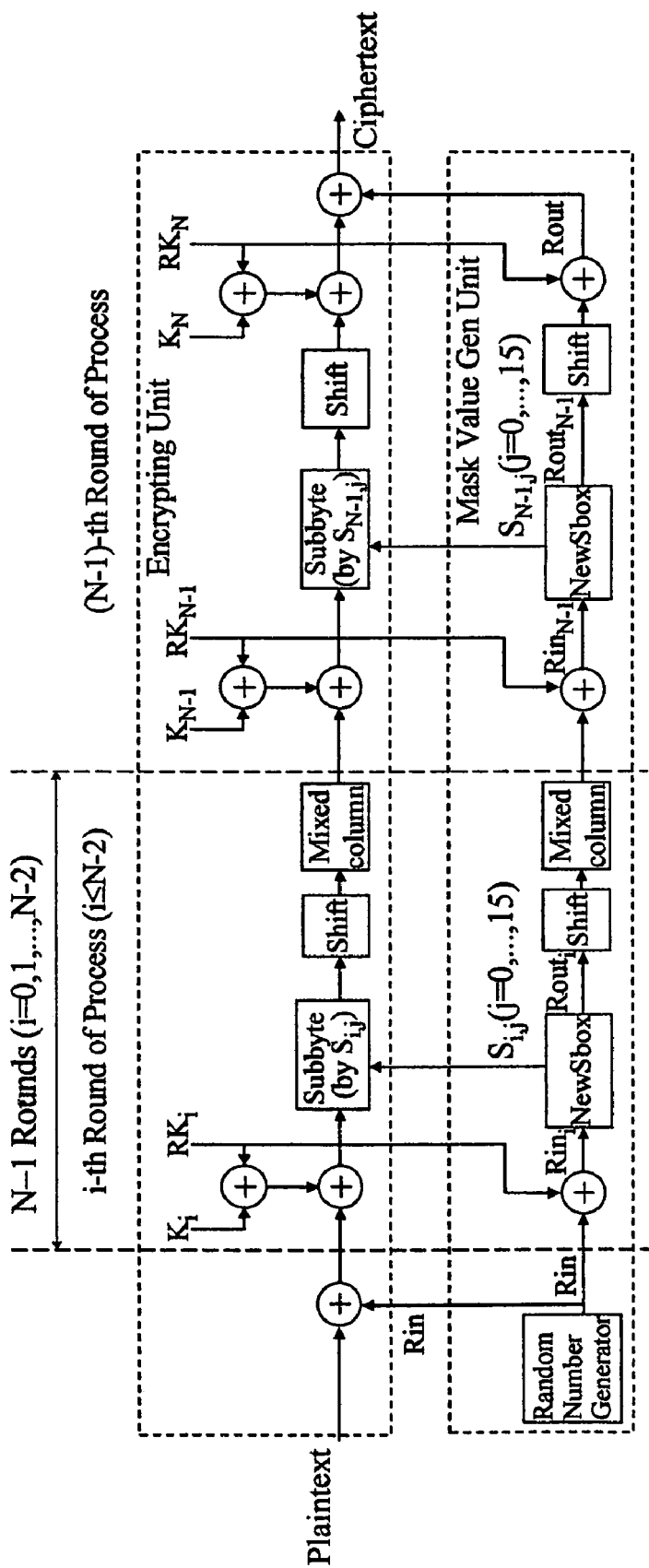
FIG. 19 shows the N-round Rijndael method employing the random mask value method as opposed to the conventional N-round Rijndael method shown in FIG. 14.
Figure 20:
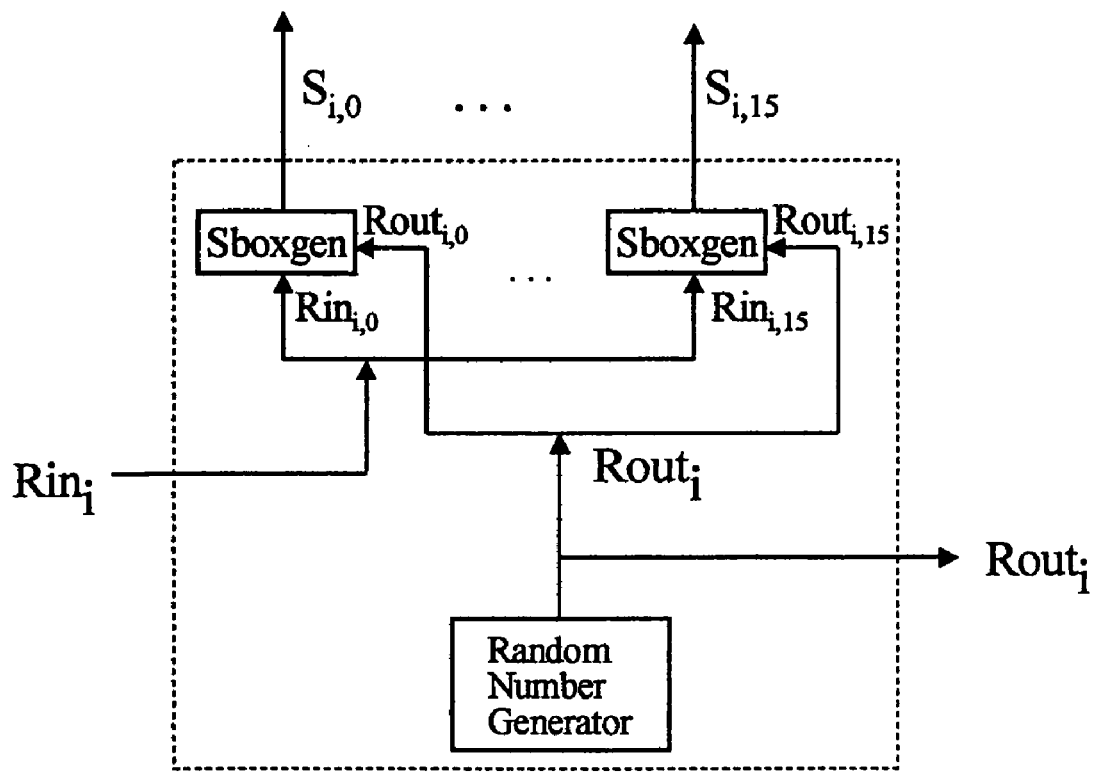
FIG. 20 shows a configuration of a NewSBox used for providing sixteen SBoxes in the process of FIG. 19.
Figure 28:
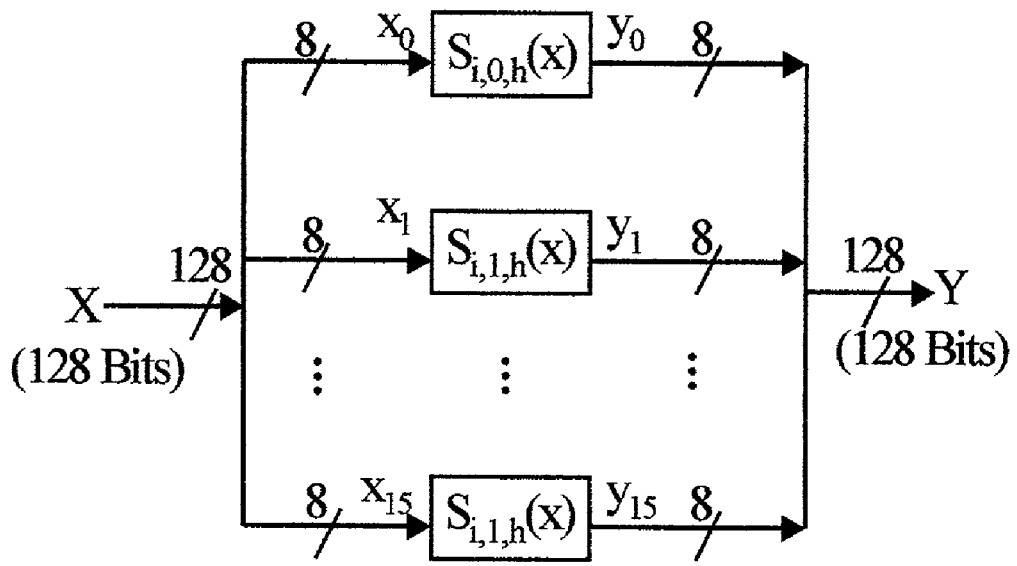
FIG. 28 shows a configuration of the Subbyte shown in FIG. 27.

When the input plaintext is provided to the encryption device 300 of FIG. 27, a random number h within a range of 0≤h≤q−1, is generated by the internal random number generator 303. In response to the generated h, the h-th one of the q input values is selected by each of the switch units 305, 329, 339, 379 and 399 shown in FIG. 27, to provide the selected value. FIG. 28 shows a configuration of the Subbyte 334 shown in FIG. 27. The Shift 335 is the one shown in FIG. 16, and the Mixedcolumn 336 is the one shown in FIG. 17. The SBox $S_{i,j,h}$ used in the Subbyte shown in FIG. 28 is expressed by the following equation (10) using the S which is the SBox for the Subbyte in the conventional Rijndael method shown in FIG. 16.

$$S_{i,j,h}(x) = S(x \oplus a_{i,j,h}) \oplus b_{i,j,h} \tag{10}$$

$a_{i,j,h}$ and $b_{i,j,h}$ in the equation (10) correspond to $Ri_{i,j}$ and $Roi_{i,j}$, respectively, in the equation (9), and to the input and output mask values, respectively, for the Subbyte in the i-th round. Since $a_{i,j,h}$ is an input mask value, it is uniquely determined by the preceding mask value, the preceding operations and the like before that Subbyte. On the other hand, $b_{i,j,h}$ can be arbitrary determined.

The flow of the process of the encryption device 300 shown in FIG. 27 is described below in Steps [1301] to [1314]. The steps [1303] to [1309] correspond to the process in the i-th round shown in FIG. 28. Steps [1310] to [1314] correspond to the process in the (N−1)th round shown in FIG. 27.

[1301] Set i=0.

[1302] Receive input plaintext, and cause the random number generator 303 to generate a random number h (0≦h≦q−1), which is used in the subsequent steps.

[1303] Select $FMin_h$, through the switch unit 305, from a set of fixed mask values $\{FMin_0, \ldots FMin_{q-1}\}$ for the input plaintext, and then XOR, through the XOR 302, the input plaintext with $FMin_h$. The output from the XOR 302 is set to be intermediate data X.

[1304] Select $FM_{i,h}$, through the switch unit 329, from a set of fixed mask values $\{FM_{i,0}, \ldots FM_{i,q-1}\}$, and perform the operation, X XOR $K_i$ XOR $FM_{i,h}$, on the sub-key $K_i$, the intermediate data X and the $FM_{i,h}$. Then, set the operated result to be new intermediate data X.

[1305] Subbyte the intermediate data X, through the Subbyte 334, in accordance with the nonlinear transform table $S_{i,j,h}(x)$ which is selected by the switch unit 339 in response to the random number h. Then, set the operated result to be new intermediate data X.

[1306] Shift the intermediate data X through the Shift 335. Set the shifted data to be new intermediate data X.

[1307] Mixedcolumn the intermediate data X through the Mixedcolumn 336. Then, set the operated result to be new intermediate data X.

[1308] Set i:=i+1.

[1309] If i<N−1, then return to Step [1303]. Otherwise, proceed to the next step.

[1310] Select $FM_{N-1,h}$, through the switch unit 329, from a set of fixed mask values $\{FM_{N-1,0}, \ldots FM_{N-1,q-1}\}$ in response to the random number h, and perform the operation, X XOR $K_{N-1}$ XOR $FM_{N-1,h}$, on the sub-key $K_{N-1}$ the intermediate data X and $FM_{N-1,h}$. Set the operated result to be new intermediate data X.

[1311] Perform the Subbyte in accordance with the nonlinear transform table $S_{N-1,j,h}(x)$ selected by the switch unit 339. The operated result is set to be new intermediate data X.

[1312] Shift the intermediate data X through the Shift 335. Set the shifted data to be new intermediate data X.

[1313] Select $FM_{N,h}$, through the switch unit 379, from a set of fixed mask values $\{FM_{N,0}, \ldots FM_{N,q-1}\}$ in response to the random number h, and perform the operation, X XOR $K_N$ XOR $FM_{N,h}$, on the intermediate data X, a sub-key $K_N$ and $FM_{N,h}$. The operated result is set to be new intermediate data X.

[1314] Select $FMout_h$, through the switch unit 399, from a set of fixed mask values $\{FMout_0, \ldots FMout_{q-1}\}$ in response to the random number h, and XOR the intermediate data X with $FMout_h$, to provide the operated result as output ciphertext Xout'.

Figure 29:
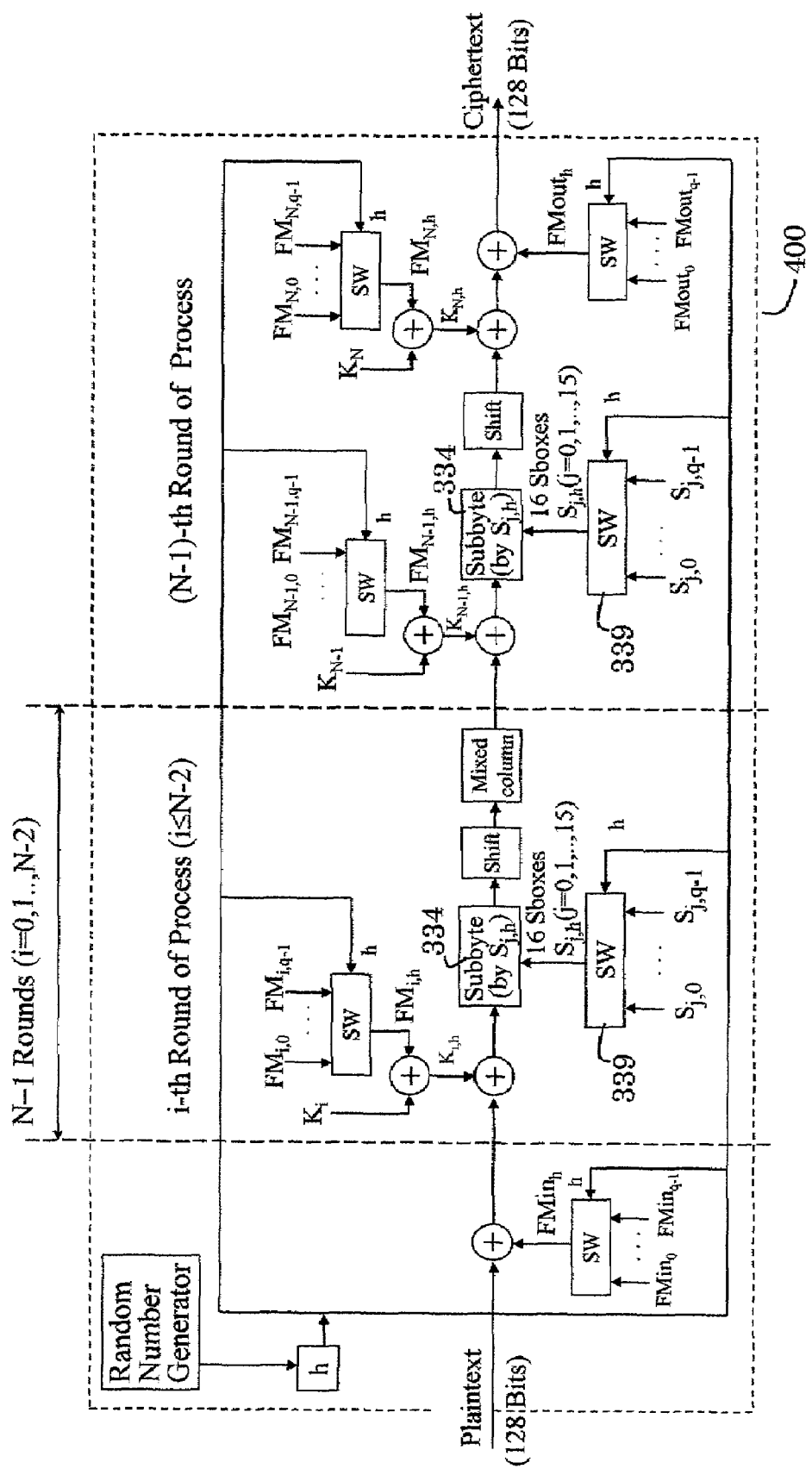
FIG. 29 shows another example of the first type of encryption device of FIG. 21.
Figure 30:
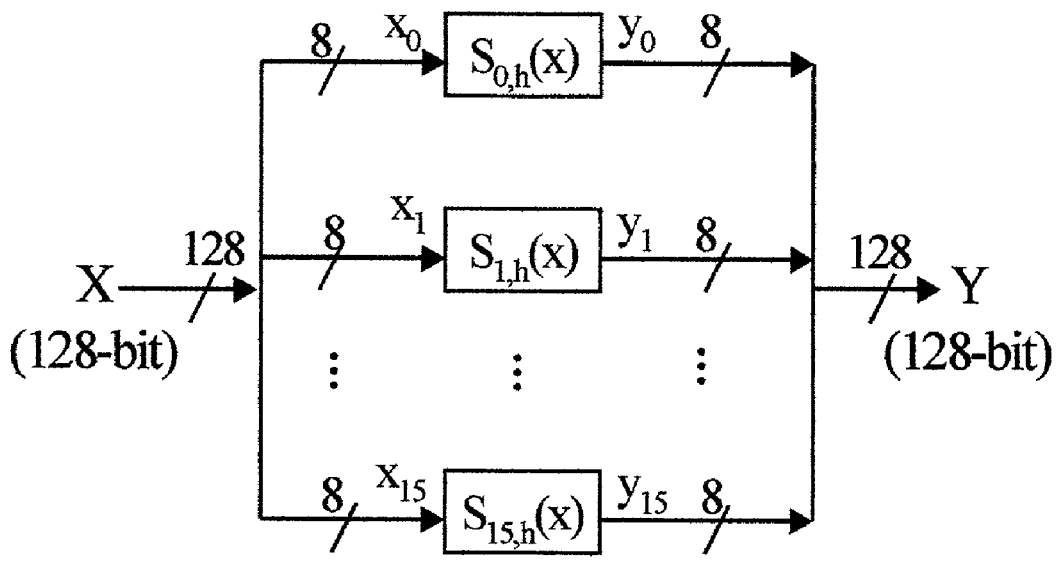
FIG. 30 shows a configuration of the Subbyte shown in FIG. 29.

FIG. 29 shows an encryption device 400 as another example in accordance with the Rijndael method to which the fixed mask value method is applied. In FIG. 29, the processor 150, the memories 160, 162 and 164 shown in FIG. 21 are not shown for simplicity. The configuration shown in FIG. 29 is the same as that shown in FIG. 27, except that sets of SBoxes provided to the respective switch units 339 coupled to the respective Subbytes 334 in the respective round functions are identical. The same elements are not described again. FIG. 30 shows an example of a configuration of the Subbyte 334 shown in FIG. 29. The mask value $FM_{i,h}$ satisfies the following equation (11) for arbitrary h=0, 1, . . . , q−1.

$$FM_{i,h} = \begin{cases} C_h \oplus FMin_h & (i = 0) \\ C_h \oplus Mixedcolumn(Shift(D_h)) & (i = 1, \ldots N-1), \\ Shift(D_h) & (i = N) \end{cases} \quad (11)$$

where $C_h$ and $D_h$ are 16-byte constants and expressed by the following equations (12) using 1-byte constant values $c_{h,j}$ and $d_{h,j}$ (j=0, 1, . . . 15).

$$\begin{cases} C_h = c_{h,15} \ldots c_{h,1} c_{h,0} \\ D_h = d_{h,15} \ldots d_{h,1} d_{h,0} \end{cases} \quad (12)$$

In the encryption device 400 shown in FIG. 29, the Subbyte 334 performs the nonlinear transform shown in FIG. 30 using sixteen Sboxes, $S_{0,h}, S_{i,h}, \ldots S_{15,h}$, selected by the switch unit 339. The sixteen $S_{j,h}$'s are S's in the conventional Rijndael method without protection against the DPA, and are expressed by an equation, $S_{j,h}(x)=S(x\ XOR\ c_{h,j})\ XOR\ d_{h,j}$, using $c_{h,j}$ and $d_{h,j}$ in the equations (12).

A process flow of the encryption device 400 of FIG. 29 corresponds to the process flow for the encryption device 400 of FIG. 27, where the Subbyte is performed in accordance with a nonlinear transform table $S_{j,h}$ selected by the switch unit 339 from sixteen Sboxes, $S_{0,h}, S_{1,h}, \ldots S_{15,h}$, in accordance with the random number h in Steps [1305] and [1311] for every round.

Thus, in the encryption device 300 of FIG. 27, the tables of the Subbytes 334 are different in the respective rounds, while, in the encryption device 400 of FIG. 29, identical tables are used in all of the rounds, which is possible for the following reason. First, the input value into the Subbyte (FIG. 16) in the conventional Rijndael process is expressed as X. On the other hand, the input value into the Subbyte shown in FIG. 30 can be expressed by X XOR $C_h$. This is so because the relation of the equation (11) is effective between the mask values. Since $C_h$ is a constant which is independent of the round number i, a value $a_{i,j,h}$ in $S_{i,j,h}(x)=S(x\ XOR\ a_{i,j,h})\ XOR\ b_{i,j,h}$ of the equation (10) can be set to a constant independent of the round number i. Since $b_{i,j,h}$ is an arbitrary constant, it can be set to a constant which is independent of the number i. Thus, the Subbyte using the SBoxes, independent of the round number i, represented by $S_{j,h}(x)=S(x\ XOR\ c_{h,j})\ XOR\ d_{h,j}$ is obtained as shown in FIG. 30. Thus, the amount of ROM required for the SBoxes used in the encryption device 400 of FIG. 29 can be reduced to 1/N of that in the encryption device 300 of FIG. 27.

In the encryption device 400 of FIG. 29, the number of sets of q SBoxes available for each round can be reduced from sixteen sets to only one set by adding a condition for the constant values $C_h$ and $D_h$ given by the following equations (13) to the equations (12) in which $C_h$ and $D_h$ are the arbitrary 16-byte constant values.

$$\begin{cases} c_{h,15} = c_{h,14} = \ldots = c_{h,0} \\ d_{h,15} = d_{h,14} = \ldots = d_{h,0} \end{cases} \quad (13)$$

Thus, the amount of the available ROM required for the SBoxes used in the encryption device 400 of FIG. 29 can be reduced to one sixteenth of that in the encryption device 300 of FIG. 27. Therefore, the ROM area required for the SBoxes in the encryption device 400 of FIG. 29 which satisfies the equations (13) can be reduced to only 1/(16N) of that in the encryption device 300 of FIG. 27.

In the encryption device 400 shown in FIG. 29, the XOR with FMin$_h$ and the XOR with FMout$_h$ are performed at the input and the output, respectively. However, since it is found that these operations do not contribute to the security, these operations may be eliminated. In addition, by using the predetermined value of the masked key, $K_i$ XOR FM$_{i,h}$, the operation of XORing the key $K_i$ with the fixed mask value FM$_i$,h can be eliminated. The elimination of these operations requires a small number of additional operations with the switch units. Thus, the Rijndael method to which the fixed mask value method is applied can be provided in an amount of computation substantially equivalent to that required for the Rijndael method without protection against the DPA.

Figure 31:
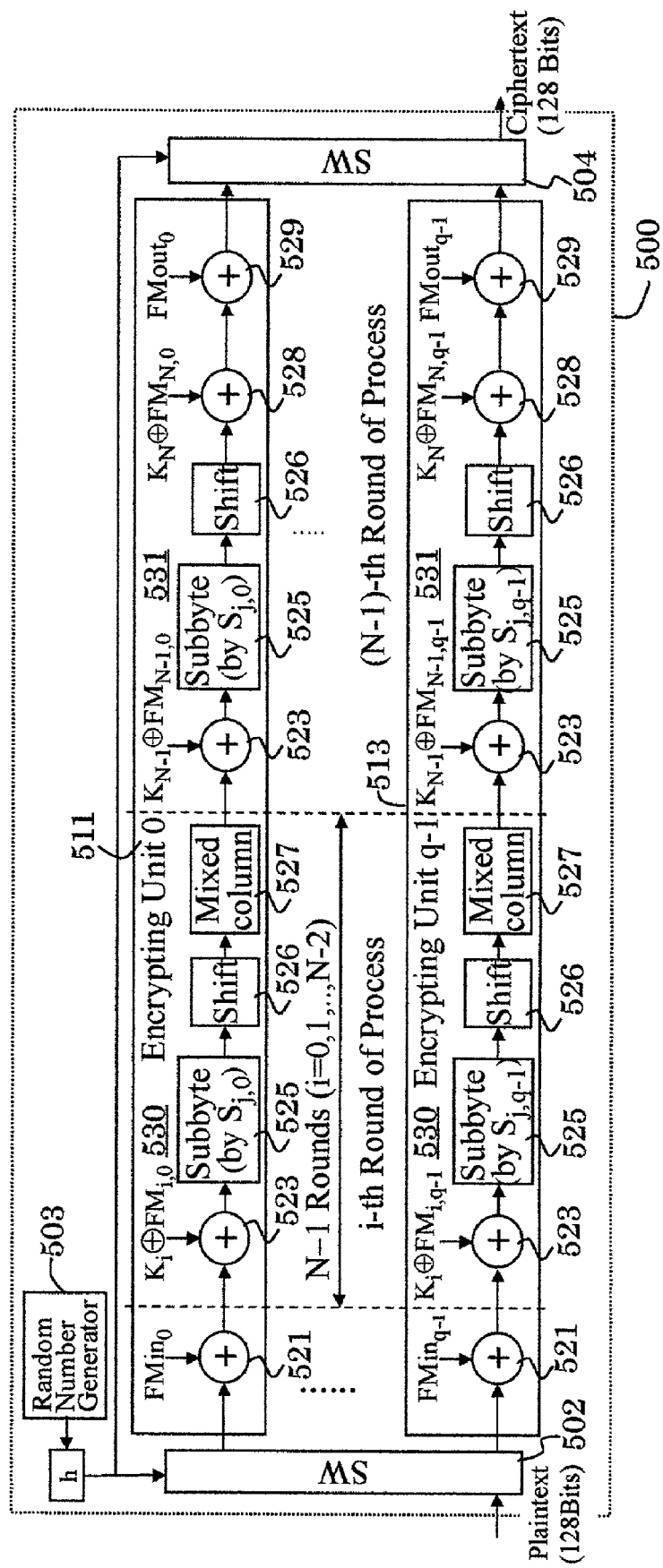
FIG. 31 shows an example of the second type of encryption device of FIG. 24.

FIG. 31 shows an example of the second type of encryption device 200 of FIG. 24, which is a further encryption device 500 in accordance with the Rijndael method to which the fixed mask value method is applied. In FIG. 31, the processor 250, the memories 260, 262 and 264 shown in FIG. 24 are not shown for simplicity. In FIG. 31, the encryption device 500 includes a random number generator 503 for generating a random number h, switch units 502 and 504 for switching in response to the random number h, and the number, q, of encrypting units 511 to 513, i.e. the 0-th to (q−1)th units coupled in parallel, one of which is selected by the switch units 502 and 504 in response to the random number h.

Each of the encrypting units 511 to 513 includes a plurality of encrypting rounds 530 (0≦i≦N−2 for a round i) for receiving an input Xin' and providing an output Xout', and the (N−1)th encrypting round 531 for receiving the output from the preceding round as an input and encrypting the input to generate an output Xout'. Each of the 0-th to (N−2)th encrypting rounds 530, which includes a fixed mask value, an XOR 523, a corresponding Subbyte 525, a Shift 526 and a Mixedcolumn 527, performs encryption in accordance with corresponding fixed mask values and fixed SBoxes. An XOR 521 is coupled to the input of the 0-th encrypting round 530. The (N−1)th encrypting round 531, which includes fixed mask values, XORs 523, 528 and 529, a Subbyte 525 and a Shift 526, performs encryption in accordance with the fixed mask values and fixed SBoxes. In FIG. 31, the XOR value, $K_i$ XOR FM$_{j,h}$, predetermined by XORing the key $K_i$ with FM$_{j,h}$ is directly provided. However, similarly to the device of FIG. 29, each key $K_i$ may be XORed with FM$_{j,h}$ by an XOR to provide the XOR value to each input of the corresponding XOR or XORs 523 to 528. In FIG. 31, similarly to the device of FIG. 29, FMin$_h$ and FMout$_h$ may be eliminated.

Also in the encryption device 500 of FIG. 31, identical SBoxes are used in every round for each unit. If the device 500 is set so as to satisfy the condition of the equations (13), the requirements of the ROM can be reduced, similarly to the encryption device 400 of FIG. 29. The amount of computation performed by the encryption device 500 can be advantageously reduced in that the necessary number of switch units is smaller than that of the encryption device 400, and is substantially equivalent to the amount of computation in the Rijndael method without protection against the DPA. Since the encryption device 500 of FIG. 31 has more Shifts and Mixedcolumns than the encryption device 400 of FIG. 29, the size of the circuit of the encryption device 500 becomes larger. Although the encryption device 500 has two selectors or switch units 502 and 504, either one of the left and right switch units 502 and 504 may be used for switching. In this case, the other switch unit may be eliminated.

Since the same encryption processes are performed with the different configurations in the encryption devices of FIGS. 29 and 31, the same degree of security can be ensured.

Now the security of the fixed mask value method is described below. In the encryption device of FIG. 27, when the number, q, of the fixed masks is large enough, the operation in the fixed mask value method is substantially the same as that in the random mask value method, and hence the same high security is ensured. The security can be proved for a simplified one-round encryption function in the random mask value method. Thus, the security can be similarly ensured for the encryption devices 400 and 500 shown in FIGS. 29 and 31, respectively, each of which uses the identical SBoxes in every round.

Described below is the security of the fixed mask value method in the case of q having a small number. When q=1, it is proved that the security is not ensured. Next, the security is evaluated when q=2, which is the second smallest value. In the encryption devices 400 and 500 of FIGS. 29 and 31, respectively, it is assumed that q=2, and only one set of SBoxes is used for every round Subbyte in accordance with the equations (13), and FMin$_h$ and FMout$_h$ are eliminated. Even in this simplest case, the security can be raised against the DPA, by setting the condition of the following equation (14) or (15) for $c_{0,j}$, $c_{1,j}$, ... $C_{q−2,j}$, and by setting the condition of the following equation (16) for $d_{0,j}$, $d_{1,j}$, ... $d_{q−2,j}$.

When q=2, and the number of SBox sets is one, for all j=0, 1, ... 15, $$c_{0,j} \oplus c_{1,j} = (10101010)_2 \text{ or } (01010101)_2 \quad (14)$$

When q≧2, and the number of SBox sets is one, for all j=0, 1, ... 15, $$(c_{0,j} \oplus c_{1,j}) v (c_{1,j} \oplus c_{2,j}) v \ldots v (c_{q-2,j} \oplus c_{q-1,j}) = (11111111)_2 \quad (15)$$

When q≧2, for all j=0, 1, ... 15, $$(d_{0,j} \oplus d_{1,j}) v (d_{1,j} \oplus d_{2,j}) v \ldots v (d_{q-2,j} \oplus d_{q-1,j}) = (11111111)_2 \quad (16),$$

where ( )$_2$ indicates a binary value.

Figure 9:
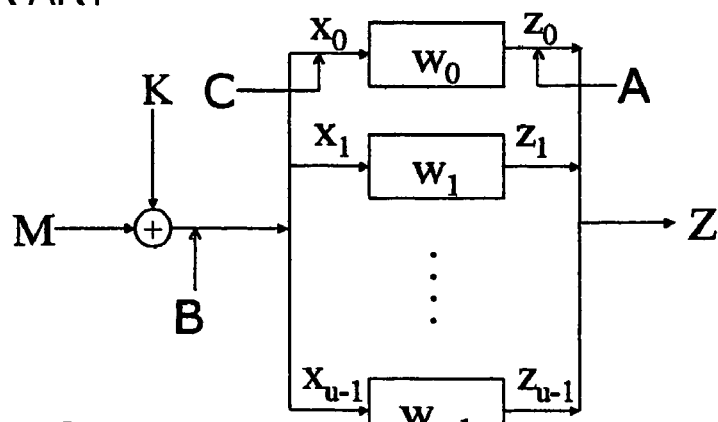
FIG. 9 shows measured points A, B and C for measuring dissipated power curves in the encryption device of FIG. 5.
Figure 10:
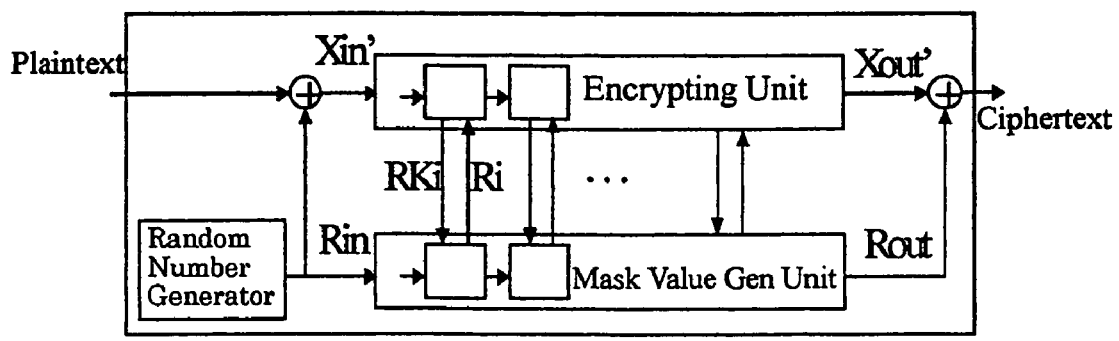
FIG. 10 shows a schematic block diagram of the process in accordance with the random mask value method.

The DPA may be performed at the predetermined timing at the measured point A shown in FIG. 9, and may be performed at the predetermined timing at the measured points B and C. The following explains that the encryption devices 400 and 500 of FIGS. 29 and 31, respectively, are sufficiently secure. Bit (x, e) described below represents a bit value at the e-th position in x.

The attacker performs the following processes (i) and (ii) for estimating a key.
(i) Using the DPA, limit the number of assumed keys (or possible keys) to be checked.
(ii) Estimate a key by checking the number of the assumed keys limited in the process (i) whether or not each of them matches in terms of its value with a true key used in the processor. The amount of computation for checking one assumed key, i.e. a pattern of the key, is defined herein as one unit (or cycle).

Checking the value of the key can be achieved by checking the relation between the plaintext and the ciphertext in the encryption processor. That is, the encryption of the plaintext by the encryption processor is compared with the encryption of the plaintext using the value of each assumed key to be checked by another encrypting means such as software. If the relations between the plaintext and the ciphertext match with each other between the encryption processor and the other encrypting means, then it is determined that the value of the assumed key is used in the encryption processor. If the two relations do not match with each other, then it is determined that the assumed key is not used.

Described below is an example of the amount of computation required to estimate a 128-bit key in the DPA. For example, if useful information about the 128-bit key can not be obtained by the DPA, then it is necessary to check all possible patterns of the 128-bit key. Thus, the necessary amount of computation is $2^{128}$ units. For example, when it is found by the DPA that the least significant bit (LSB) of the 128-bit key is "0", all possible patterns of the remaining 127 most significant bits (MSBs) are checked. Thus, the required amount of computation is $2^{127}$ units.

Next, the security of the output from the SBox against the DPA is described below in the case in which the DPA at the measured point A shown in FIG. 9 is applied to the encryption devices 400 and 500 of FIGS. 29 and 31, respectively. It is appreciated that, if the DPA is applied at the timing of loading the output value of each SBox in the Subbyte in the 0-th round shown in FIGS. 29 and 31, the key $K_i$ can be determined for decryption in the amount of computation proportional to $2^{8(16-F)} = 2^{128-8F}$, where $F = f_0 + f_1 + \ldots + f_{15}$, and $f_j$ is defined as described below. It is assumed that the output mask value from the j-th (j=0, 1, ... 15) SBox is $d_{0,j}$, $d_{1,j}, \ldots d_{q-1,j}$. Then for $WD_j = (d_{0,j} \oplus d_{1,j}) v (d_{1,j} \oplus d_{2,j}) v \ldots v (d_{q-2,j} \oplus d_{q-1,j})$, $$\begin{cases} f_j = 0, & \text{if } WD_j = (11111111)_2, \\ f_j = 1, & \text{otherwise.} \end{cases}$$

Thus, when $f_j=0$ for all of j=0, 1, ... 15, the encryption device is most secure against the DPA. For this purpose, $WD_j = (11111111)_2$ must be satisfied for all j=0, 1, ... 15. In this case, the required amount of computation for determining the key through the DPA is the maximum value of $2^{128}$.

Described below is the security against the DPA for the output of the key XOR (at the measured point B shown in FIG. 9) or the input to the SBox (at the measured point C shown in FIG. 9). The security against the DPA at the predetermined timing at the measured points B and C shown in FIG. 9 depends on what model can be used to approximate the relation between the measured voltage and the load value when the value is loaded to the RAM in the encryption processor. First, the DPA using an arbitrary model is discussed, and then the DPA using an adjacent bit model expressed by the equation (6) is discussed later.

In the arbitrary model, the DPA is applied at the predetermined timing at the measured points B and C as shown in FIG. 9 to the encryption devices 400 and 500 of FIGS. 29 and 31, respectively, where it is assumed that the number of sets of SBoxes to be used in the Subbyte is set to be only one in accordance with the equations (13), for the purpose of explanation. It is found that, if the DPA is applied at the timing of loading the output value from the key XOR in the Subbyte in the 0-th round, then the key $K_i$ can be determined for decryption by the amount of computation proportional to $2^{128-(15/16)H}$, where $H = h_0 + h_1 + \ldots + H_{15}$ and the value $h_j$ is defined as described below. It is assumed that the input mask value of the j-th SBox (j=0, 1, ... 15) is $c_{0,j}, c_{1,j}, \ldots c_{q-1,j}$. Then for $WC_j = (c_{0,j} \oplus c_{1,j}) v (c_{1,j} \oplus c_{2,j}) v \ldots v (c_{q-2,j} \oplus c_{q-1,j})$
and $WC_j = (wc_{j,7}\ wc_{j,6}\ wc_{j,5}\ wc_{j,4}\ wc_{j,3}\ wc_{j,2}\ wc_{j,1}\ wc_{j,0})_2$, $h_j$=(number of e's such that $wc_{j,e}=0$ for e=0, 1, ... 7).

Thus, when $h_j=0$ for j=0, 1, ... 15, the encryption device is most secure against the DPA. For this purpose, $WC_j = (11111111)_2$ must be satisfied for all j=0, 1, ... 15. In this case, the required amount of computation for determining the key through the DPA is the maximum value of $2^{128}$.

Next, in the adjacent bit model expressed by the equation (6) which is applicable for the DPA, it is assumed that the number of different SBox sets to used in the Subbyte is limited to one in accordance with q=2 and the equations (13), for the purpose of the explanation. It is known that the adjacent bit model is appropriate for approximating a voltage in a low cost smart card. If this model is applicable, the key information which can not be analyzed for decryption in the arbitrary model above can be analyzed for decryption. In the Subbyte in the 0-th round in the encryption devices 400 and 500 of FIGS. 29 and 31, respectively, the DPA is applied at the timing (at the predetermined timing at the measured point C shown in FIG. 9) of loading the input value of each SBox, and thereby the key Ki can be determined for decryption in the amount of computation proportional to $2^{128-(15/16)H}$, where $H = h_0 + h_1 + \ldots + H_{15}$. The value $h_j$ is defined as described below. It is assumed that the input mask values of the j-th SBox are $c_{0,j}$ and $c_{1,j}$, for $WC_j = C_{0,j} \oplus C_{1,j} = (W_{e,j},7\ WC_{j,6} \ldots WC_{j,0})_2$, $h_j$=(number of e's such that $WC_{j,e}=0$ for e=0, 1, ... 7).
+(number of e's such that $WC_{j,e}=WC_{j,e+1}=1$ for e=0, 1, ... 7), where $WC_{j,e}=0$ or 1. The value j represents the ordinal number of an SBox. The value e represents a bit position.

Since the number of SBox sets is one, H is the minimum value of 64 when the conditional equation (14) is $c_{0,j}$ XOR $c_{1,j}=(01010101)_2$ or $(10101010)_2$, and the amount of computation required to determine the key by the DPA is $2^{68}$ at the maximum.

As described above, in order to determine a 128-bit secret key in the Rijndael method by means of the DPA for an encryption device which employs the fixed mask value method of the invention, where the conditional expression (14) or the equation (15) for $c_{0,j}, C_{1,j}, \ldots c_{q-1,j}$ is satisfied and also the condition of the equation (16) for $d_{0,j}, d_{1,j}, \ldots d_{q-1,j}$, is satisfied, the amount of computation proportional to $2^{128}$ or $2^{68}$ as shown in TABLES 1 and 2 is required. It should be noted that the threshold of the security against the DPA is $2^{64}$ in terms of the amount of computation. Although the amount of computation $2^{68}$ is smaller than the amount of computation $2^{128}$ which is required for computing all of the bit patterns of the key, it is practically impossible to determine the key for decryption within a limited time. Therefore, it is practically impossible to determine a secret key for decryption, even if the DPA is performed on an encryption processor to which the fixed mask value method is applied in accordance with the invention.

TABLE 1

Relation between Mask Value and Amount of
Computation Required for Determining
128-bit Secret Key by DPA of Loading Sbox
Output Values, in Fixed Mask Value Method

| Value of $WD_j=(d_{0,j} \oplus d_{1,j}) \vee (d_{1,j} \oplus d_{2,j}) \vee \ldots \vee (d_{q-2,j} \oplus d_{q-1,j})$ | Amount of Computation for Key Analysis ($q \geq 2$, Arbitrary Model) |
|---|---|
| For all j, $0 \leq j \leq 15$ $WD_j=(11111111)_2$ (Fixed Mask Value Method) | $2^{128}$ |
| General Case | $2^{128-8F}$, $F=f_0+f_1+ \ldots +f_{15}$ $f_j=0$ (if $WD_j=(11111111)_2$) $f_j=1$ (otherwise) |

Table 2. Relation between Mask Value and Amount of Computatation Required for Determining 128-bit Secret Key by DPA of loading Sbox Input Values, for One Common Cbox Set for Subbytes, in Fixed Mask Value Method.

TABLE 2

Relation between Mask Value and Amount of
Computation Required for Determining
128-bit Secret Key by DPA of Loading Sbox
Output Values, for One Common Sbox Set for
Subbytes, in Fixed Mask Value Method

| Value of $WC_j=$ $(c_{0,j} \oplus c_{1,j}) \vee (c_{1,j} \oplus c_{2,j}) \vee \ldots \vee (c_{q-2,j} \oplus c_{q-1,j})$ | Amount of Computation for Key Analysis ($q \geq 2$, Arbitrary Model) | Amount of Computation for Key Analysis ($q=2$, Adjacent Bit Model) |
|---|---|---|
| For all j, $0 \leq j \leq 15$, $(11111111)_2$ (Fixed Mask Value Method) | $2^{128}$ | $2^{23}$ |
| For all j, $0 \leq j \leq 15$ $(01010101)_2$, $(10101010)_2$ (Fixed Mask Value Method) | $2^{68}$ | $2^{68}$ |
| $WC_j=$ $(wc_{j,7}wc_{j,6}wc_{j,5}wc_{j,4}wc_{j,3}$ $wc_{j,2}wc_{j,1}wc_{j,0})_2$ (General Case) | $2^{128-(15/16)H}$ $H=h_0+h_1+ \ldots +h_{15}$ $h_j=$(Number of $wc_{j,e}=0$) (e=0, 1, ... 7) | $2^{128-(15/16)H}$ $H=h_0+h_1+ \ldots +h_{15}$ $h=$(Number of $wc_{j,e}=0$) + (Number of $wc_{j,e}=wc_{j+1,e}=1$) (e=0, 1, ... 7) |
| For all j, $0 \leq j \leq 15$ $(00000000)_2$ (Minimum Security) | $2^8$ | $2^8$ |

Therefore, the security of the fixed mask value method is described as follows:

1. For q equal to two or more, the fixed mask value method is secure against the DPA of loading the output value of the SBox, if the condition of the equation (16) is satisfied. That is so because the amount of computation of $2^{128}$ is required for estimating the key. This amount of computation is equal to that required when all possible patterns of the key are checked.

2. For q equal to two or more, the fixed mask value method is secure against the DPA of loading the input value of the SBox, if the condition of the equation (15) is satisfied in the arbitrary model other than the adjacent bit model. That is so because the amount of computation of $2^{128}$ is required for estimating the key.

3. For q=2, the fixed mask value method is secure against the DPA of loading the input value of the SBox, if the condition of the equations (13) is satisfied, and $c_{0,j}$ XOR $c_{1,j}=(01010101)_2$ or $(10101010)_2$ of the conditional equation (14) is satisfied for the adjacent bit model. That is so because the amount of computation of $2^{68}$ is required for estimating the key and hence it is practically impossible to estimate the key within a limited time.

4. For $q \geq 3$, the fixed mask value method is secure against the DPA, if the condition of the equation (15) is satisfied similarly to item 2 above because the analysis for q=2 is not applicable. That is so because the amount of computation of $2^{128}$ is required for estimating the key in both of the adjacent bit model and the arbitrary model. However, the required capacity of ROM increases.

5. In item 3 above, the number of sets of the SBoxes is limited to one in the conditional equation (14) (for q=2, the number of possible Sbox output values is two). However, if the number of different sets of the SBox is set to be n, the capacity of the ROM is n times larger. However, the required amount of computation increases by $2^{8(n-1)} \times n^{16}$ times.

Figures 32A, 32B:
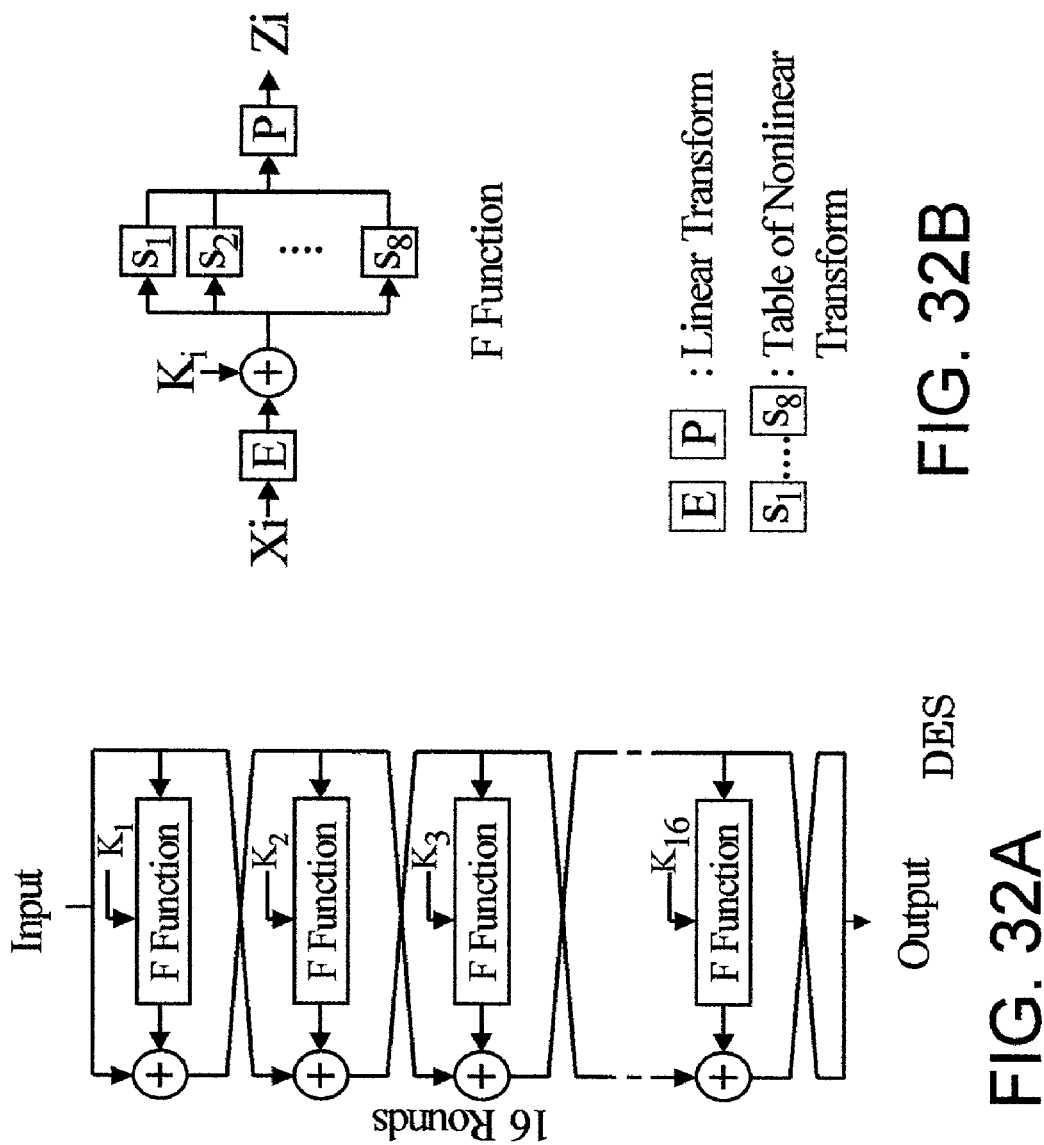
FIGS. 32A and 32B show a configuration of a conventional DES.

The fixed mask value method in accordance with the invention can be applied to Feistel encryption such as DES as well as to SPN encryption including the Rijndael encryption method. FIG. 32A shows a configuration of in accordance with the conventional DES. FIG. 32B shows a more detailed configuration of an F function shown in FIG. 32A. In FIG. 32B, the F function includes linear transforms E and P and nonlinear transforms $S_1$ to $S_8$ having respective nonlinear transform tables $S_1$ to $S_8$.

FIG. 33A shows an example of the first type of encryption device 100 shown in FIG. 21, which is an encryption device 700 in accordance with the DES encryption of FIGS. 32A and 32B to which the fixed mask value method is applied in a manner similar to the encryption device 400 of FIG. 29. FIG. 33B shows a more detailed configuration of a F function shown in FIG. 33A. In FIG. 33A, the processor 150, the memories 160, 162 and 164 shown in FIG. 21 are not shown for simplicity.

The encryption device 700 includes a random number generator 701 for generating a random number h, a selector 702 for selecting one of the fixed mask values FMin$_h$ in response to the random number h to provide the selected value, an XOR 712 for XORing input plaintext with the selected fixed mask value FMin$_h$, a plurality of (sixteen, for example) F function encrypting rounds 710 to 720 for receiving an input and encrypting the input in accordance with the random number h and the sub-key Ki to generate an output, a selector 704 for selecting one of the fixed mask values FMout$_h$ in response to the random number h to provide the selected value, and an XOR 714 for XORing the output from the F function encrypting round 720 with the selected fixed mask value FMout$_h$ to produce ciphertext. Each of the F function encrypting rounds 710 to 720 receives the output from the XOR in the preceding round, performs the F function shown in FIG. 33B, and XORs, through the XORs (722 and 723), the output from the function and the output from the preceding round to provide an output.

The F function of FIG. 33B includes a selector 759 for providing a fixed mask value FM$_{i,h}$ selected in response to the random number h, an XOR 762 for XORing the sub-key $K_i$ with the fixed mask value $FM_{i,h}$ to provide an output, an XOR 763 for XORing the output value with an input Xi' linearly transformed by a linear transform E, selectors 752 to 756 for selecting one of Subbytes $S_{j,h}$ in response to the random number h to provide the output from the XOR 763, Subbytes $S_{j,h}$ for performing the Subbyte in accordance with the respective nonlinear table Sboxes $S_{j,h}$, selectors 754 to 757 for selecting one of the Subbytes $S_{j,h}$ in response to the random number h to provide an output, and a linear transform P for linearly transforming the output from the selectors 754 to 757 to provide an output Zi'.

The processor 150 in FIG. 21 controls the processing elements 701 to 763 and the like of the encryption device 700 of FIGS. 33A and 33B in accordance with the program stored in the program memory 160. Alternatively, the processor 150 may provide the processing elements 701 to 763 and the like, by executing the program in the memory 160 which is implemented to provide the functions corresponding to the processing elements 701 to 763 and the like. In this case, FIGS. 33A and 33B may be considered as a flow diagram.

Figures 34A, 34B:
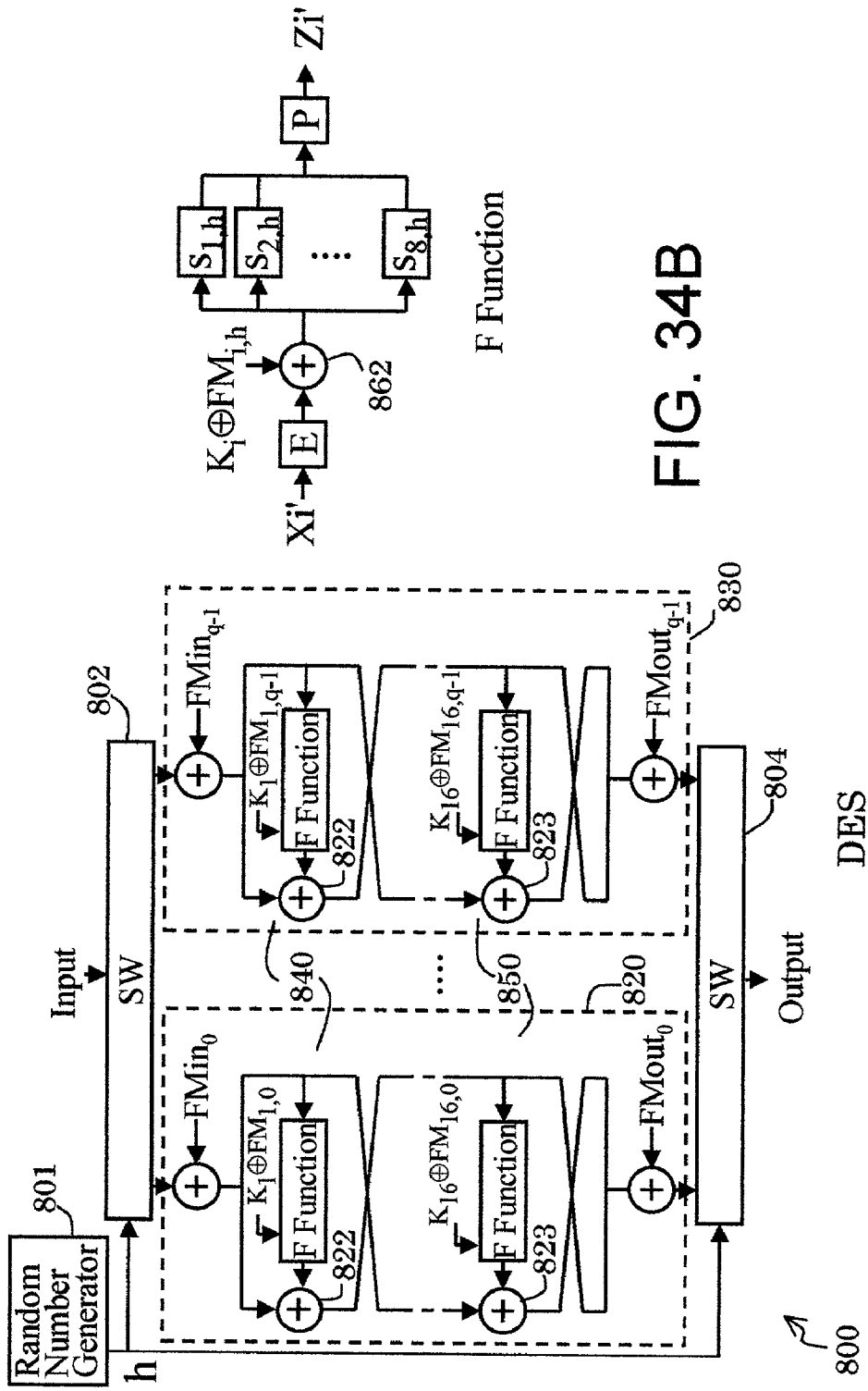
FIGS. 34A and 34B show a configuration of the Feistel DES employing the fixed mask value method shown in FIG. 31.

FIG. 34A shows an example of the second type of encryption device 200 shown in FIG. 24, which is an encryption device 800 in accordance with the DES encryption of FIGS. 32A and 32B to which the fixed mask value method is applied in a manner similar to the encryption device 500 of FIG. 31. FIG. 34B shows a more detailed configuration of a F function shown in FIG. 34A. In FIG. 34A, the processor 250, the memory 260, 262 and 264 shown in FIG. 24 are not shown for simplicity.

In FIG. 34A, the encryption device 800 includes a random number generator 801 for generating a random number h, switch units 802 and 804 for performing switching operations in response to the random number h, and a plurality of encrypting units 820 to 830 selected by the switch units 802 and 804 in response to the random number h.

The processor 250 in FIG. 24 controls the processing elements 801 to 862 and the like of the encryption device 800 of FIGS. 34A and 34B in accordance with the program stored in the memory 260. Alternatively, the processor 150 may provide the processing elements 801 to 862 and the like, by executing the program in the memory 160 which is implemented to provide the functions corresponding to the processing elements 801 to 862 and the like. In this case, FIGS. 34A and 34B may be considered as a flow diagram.

Each of the encrypting units 820 to 830 includes a plurality of (sixteen, for example) F function encrypting rounds 840 to 850 for receiving an input and generating an output. Each of the F function encrypting rounds 840 to 850 receives the output from the preceding XOR, performs the F function shown in FIG. 34B in accordance with the Ki XOR $FM_{i,h}$, XORs, through the XOR (822 and 823), the output from the F function with the output from the preceding round to provide an output.

The F function of FIG. 34B includes an XOR 862 for XORing the input Xi' linearly transformed by a linear transform E with the XOR value of the sub-key $K_i$ with the fixed mask value $FM_{i,h}$, Subbytes $S_{j,h}$ (i=1, 2, ... 8) in accordance with the nonlinear table SBoxes $S_{j,h}$, and a linear transform P for linearly transforming the output from the Subbyte $S_{j,h}$ to provide an output Zi'.

Figure 35:
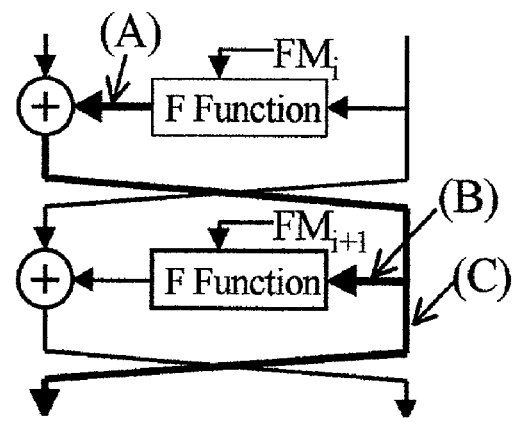
FIG. 35 shows propagation of the mask over the rounds in the encryption in the Feistel encryption device.

In FIGS. 33 and 34, the input mask FMin may be eliminated similarly to the Rijndael method described above. However, FMout can not be eliminated in the same manner as the Rijndael method. FIG. 35 shows the propagation of the influence of the mask over plural rounds of the Feistel encryption device. In FIG. 35, a solid line indicates a masked path. The FMout can not be eliminated, because, in the Feistel encryption, the data (A) masked in a certain round affects not only the next round (B) but also the subsequent rounds (C) as shown in FIG. 35.

Figure 36:
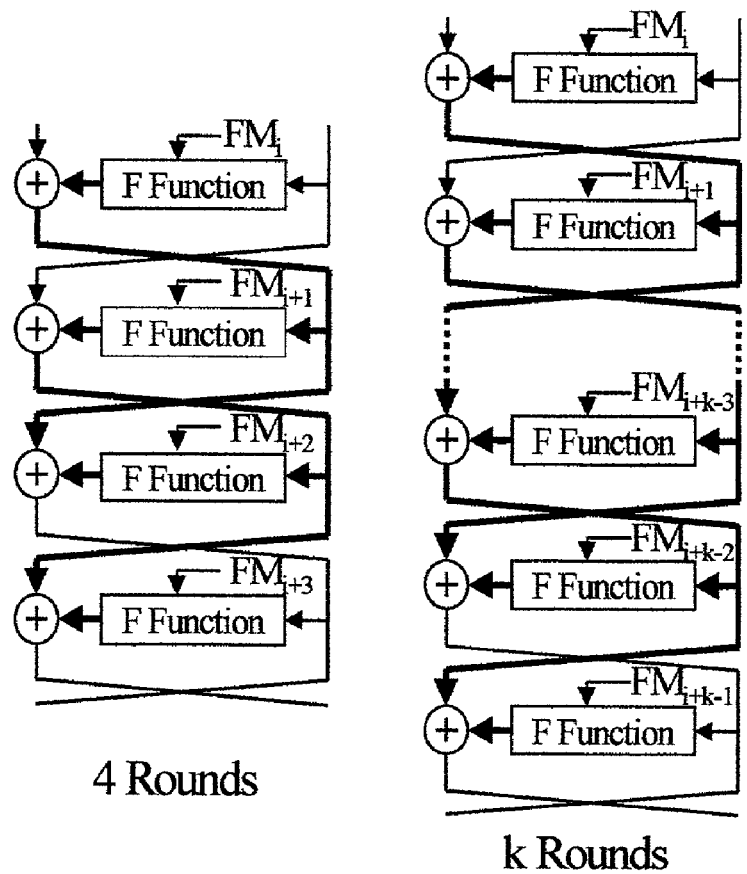
FIG. 36 shows paths from the generation of a mask to cancellation of the mask value in the Feistel encryption device.

Thus, in the Feistel encryption, the mask value in the preceding round can not be fully canceled in the current round. FIG. 36 shows paths from the generation of a mask to the cancellation of the mask value in the Feistel encryption device. In FIG. 36, the solid lines indicate the masked path. In the Feistel encryption, at least four rounds are required from masking to canceling the mask value as shown in FIG. 36, and the mask value can be canceled over four rounds or more. The technique of canceling the mask value provides for generating an output mask which is equivalent to the preceding mask to provide cancellation in the XOR in the Feistel encryption, as shown in FIG. 36, rather than making use of arbitrarily selectable generated mask for a nonlinear transform in the SPN encryption.

This technique makes it possible to eliminate the last mask FMout in the encryption. If the technique is applied to the encryption of four or more rounds in accordance with the DES and the like, a configuration of canceling a fixed mask value in four rounds may be repeatedly provided, or a fixed mask value to be canceled in the last round may be used.

In the embodiments above, the fixed mask value method is applied to all of the rounds. However, as described above in connection with the condition for making the DPA possible, in order to succeed in the DPA, an input value must be known and an attacker must control the value. Thus, if the fixed mask value method is applied to only the first several rounds in the encrypting process, then the inputs are unknown and uncontrollable in the subsequent rounds, which hence require no protection against the DPA. Thus, the required encrypting process for the secure decryption can be reduced.

TABLE 3 shows comparison between the results of the encryption in implementation of the Rijndael method employing the fixed mask value method, the conventional encryption without protection against the DPA, and the encryption employing the conventional random mask value method. In TABLE 3, S represents the processing time when no protection is provided, R represents the capacity of the RAM required when no protection is provided, and M represents the capacity of the ROM required when no protection is provided, where R<<M. The security is expressed by the number of possible keys to be checked by an attacker to estimate the key.

TABLE 3

Comparison between Fixed Mask Value Method,
No Protection against DPA, and Random Mask
Value Method, in Rijndael Method (R<<M)

| | No Protect | Fixed Mask Value Method $q \geq 2$ Arbitrary Model | Fixed Mask Value Method q=2 Adjacent Bit Model | Random Mask Value Method |
|---|---|---|---|---|
| Time for Process | S | ≅S | ≅S | >>S (3S to 5S) |
| Amount of RAM | R | ≅R | ≅R | ≥R+M |
| Amount of ROM | M | qM | 2M | ≅M |
| Security | 1 | $\geq 2^{128}$ | $2^{72}$ | $>>2^{128}$ |

TABLE 4 shows comparison between the results of the encryption in implementation of the DES employing the fixed mask value method, the conventional encryption without protection against the DPA and the encryption employing the conventional random mask value method.

TABLE 4

Comparison between Fixed Mask Value Method,
No Protection against DPA, and Random Mask
Value Method, in DES (R<<M)

|  | No Protection | Fixed Mask Value Method q=2 | Random Mask Value Method |
|---|---|---|---|
| Time for Process | S | ≅S | >>S (3S to 5S) |
| Amount of RAM | R | ≅R | ≧R+M |
| Amount of ROM | 8M | 16M | ≅8M |
| Security | 1 | >>$2^{56}$ | >>$2^{56}$ |

It is seen from TABLES 3 and 4 that the random mask value method requires a long processing time and a large capacity of RAM, while the fixed mask value method requires a capacity of ROM two or three times as large, but does not require a large RAM area. Thus, the fixed mask value method ensures sufficient security, requiring a processing time comparable to that required by the encryption without the protection.

In the embodiments above, the Rijndael method and DES are mainly described, but the fixed mask value method can also be applicable to the SPN encryption method other than the Rijndael method, the Feistel encryption method other than the DES, and any other encryption in combination of these methods, and exhibit similar effectiveness.

The above described embodiments are only typical examples, and their modifications and variations are apparent to people skilled in the art. It should be noted that people skilled in the art can make various modifications to the above-described embodiments without departing from the principle of the invention and the accompanying claims.

Advantages of the Invention

According to the invention, advantageously, a encryption processor for encrypting data with a common key is efficiently protected from analysis for decryption, estimation of a secret key becomes difficult, and the security of the encryption processor can be enhanced.

What is claimed is:

1. An encryption device comprising XOR means and nonlinear transform means, said encryption device further comprising:

a random number generator for generating a random number h, where h is an integer between zero and q−1;

q sets of fixed mask values $FM_{i,h}$, where q is an integer equal to three or more, wherein equations, $FM_{0,h}=C_h$XOR $L1_0$ $(FMin_h)$, and $C_h=c_{h,15}c_{h,14}\ldots c_{h,0}$, are satisfied, where $FM_{i,j}$ is the i-th fixed value of the h-th set of said q sets of fixed mask values, where $FMin_h$ is a selected one of said fixed mask values, and where i is an integer, q sets of fixed S-box table, wherein equations, $(c_{0,j}$ XOR $c_{1,j})$ v $(c_{1,j}$ XOR $c_{2,j})$ v $\ldots$ v $(c_{q-2,j}$ XOR $c_{q-1,j})=(111\ldots 11)_2$ and $(d_{0,j}$ XOR $d_{1,j})$ v $(d_{1,j}$ XOR $d_{2,j})$ v $\ldots$ v $(d_{q-2,j}$ XOR $d_{q-1,j})=(111\ldots 11)_2$ are satisfied, a fixed S-box table before masking is defined as S[x], and i-th masked fixed S-box table is defined as $S_{j,h}[x]=$ [x XOR $c_{h,j}$] XOR $d_{h,j}$ for the j-th fixed value, where j is an integer;

linear transform means $L1_i(x)$ and linear transform means $L2_i(x)$, wherein the linear transform means $L1_i(x)$, the nonlinear transform means with the masked fixed S-box table $S_{j,h}[x]$ and the linear transform means $L2_i(x)$ operate in i-th one of rounds; and a first selector for selecting one fixed value of the h-th set of said q sets of fixed mask values in response to the random number h, said XOR means XORing an input thereto with an XOR of a key with said selected fixed value.

2. The encryption device according to claim 1, characterized in that the linear transform means $L1_i(x)$ is defined as $L1_i(x)=x$.

3. The encryption device according to claim 1, characterized in that the linear transform means $L2_i(x)$ is defined as $L2_i(x)=$MixedColumn(Shift(x)).

4. The encryption device according to claim 1, characterized in that the linear transform means $L2_i(x)$ is defined as Shift(x).

5. An encryption device comprising XOR means and nonlinear transform means, said encryption device further comprising:

a random number generator for generating a random number h, where h is an integer between zero and q−1;

q sets of fixed mask values $FM_{i,h}$, where q is an integer equal to three or more, wherein equations, $FM_{i,h}=C_h$XOR $L1i(L2i−1(D_h))$ for i≧1, $C_h=c_{h,15}c_{h,14}\ldots c_{h,0}$, and $D_h=d_{h,15}d_{h,14}\ldots d_{h,0}$, are satisfied, where i is an integer, q sets of fixed S-box table, where equations, $(c_{0,j}$ XOR $c_{1,j})$v$(c_{1,j}$ XOR $c_{2,j})$v $\ldots$ v$(c_{q-2,j}$ XOR $c_{q-1,j})=(111\ldots 11)_2$ and $(d_{0,j}$ XOR $d_{1,j})$v$(d_{1,j}$ XOR $d_{2,j})$v $\ldots$ v$(d_{q-2,j}$ XOR $d_{q-1,j})=(111\ldots 11)_2$, are satisfied, and a fixed S-box table before masking is defined as S[x] and an i-th masked fixed S-box table is defined as $S_{j,h}[x]=$S[x XOR $c_{h,j}$] XOR $d_{i,j}$ for the j-th fixed value, where j is an integer;

linear transform means $L1_i(x)$ and linear transform means $L2_i(x)$, wherein the linear transform means $L1_i(x)$, the nonlinear transform means with the masked fixed S-box table $S_{j,h}[x]$ and the linear transform means $L2_i(x)$ operate in i-th one of rounds; and a first selector for selecting one fixed value of the h-th set of said q sets of fixed mask values in response to the random number h;

said XOR means XORing an input thereto with an XOR of a key with said selected fixed value.

6. The encryption device according to claim 5, characterized in that the linear transform means $L1_i(x)$ is defined as $L1_i(x)=x$.

7. The encryption device according to claim 5, characterized in that the linear transform means $L2_i(x)$ is defined as $L2_i(x)=$MixedColumn(Shift(x)).

8. The encryption device according to claim 5, characterized in that the linear transform means $L2_i(x)$ is defined as Shift(x).

9. An encryption device comprising XOR means and nonlinear transform means, said encryption device further comprising:

a random number generator for generating a random number h, where h is an integer between zero and q−1;

q sets of masked fixed mask values $FM_{i,h}$, where q is an integer equal to three or more, wherein equation, $FM_{0,h}=C_h$XOR $L1_0$ $(FMin_h)$, and $C_h=c_{h,15}c_{h,14}\ldots c_{h,0}$, are satisfied, where $FM_{i,h}$ is the i-th fixed value of the h-th set of said q sets of fixed mask values, where $FMin_h$ is a selected one of said fixed mask values, and where i is an integer, q sets of fixed S-box table, wherein equations $(c_{0,j}$ XOR $c_{1,j})$ v $(c_{1,j}$ XOR $c_{2,j})$ v ... v $(C_{q-2,j}$ XOR $c_{q-1,j})=$ $(111 ... 11)_2$ and $(d_{0,j}$ XOR $d_{1,j})$ v $(d_{1,j}$ XOR $d_{2,j})$ v ... v $(d_{q-2,j}$ XOR $d_{q-1,j})=(111 ... 11)_2$ are satisfied, a fixed S-box table before masking is defined as S[x], and i-th masked fixed S-box table is defined as $S_{j,h}[x]=$ S[x XOR $c_{h,j}$] XOR $d_{h,j}$ for the j-th fixed value, where j is an integer;

a selector for selecting one of said q sets of fixed S-box tables in response to the random number h, said nonlinear transform means nonlinearly transforming an input thereto in accordance with said selected set of fixed S-box tables; and a plurality of encrypting rounds, wherein i-th one of said plurality of encrypting rounds comprises the XOR means, the fixed S-box tables, the selector, linear transform means $L1_i(x)$ and linear transform means $L2_i(x)$, for that round, and wherein the fixed S-box tables for said plurality of respective encrypting rounds are identical, and wherein the linear transform means $L1_i(x)$, the nonlinear transform means with the masked fixed S-box table $S_{j,h}[x]$ and the linear transform means $L2_i(x)$ operate in that round.

10. The encryption device according to claim 9, characterized in that the linear transform means $L1_i(x)$ is defined as $L1_i(x)=x$.

11. The encryption device according to claim 9, characterized in that the linear transform means $L2_i(x)$ is defined as $L2_i(x)=$MixedColumn(Shift(x)).

12. The encryption device according to claim 9, characterized in that the linear transform means $L2_i(x)$ is defined as Shift(x).

13. An encryption device comprising XOR means and nonlinear transform means, said encryption device further comprising:

a random number generator for generating a random number h, where h is an integer between zero and q−1;

q sets of masked fixed mask values $FM_{i,h}$, where q is an integer equal to three or more, wherein equations, $FM_{i,h}=C_h$XOR $L1_j(L2_{j-1}(D_h))$ for $i≧1$, $C_h=c_{h,15}c_{h,14} ... c_{h,0}$, and $D_h=d_{h,15}d_{h,14} ... d_{h,0}$, are satisfied, where $FM_{i,h}$ is the i-th fixed value of the h-th set of said q sets of fixed mask values, where i is an integer, q sets of fixed S-box tables, wherein equations, $(c_{0,j}$ XOR $c_{1,j})$ v $(c_{1,j}$ XOR $c_{2,j})$ v ... v $(C_{q-2,j}$ XOR $c_{q-1,j})=$ $(111 ... 11)_2$ and $(d_{0,j}$ XOR $d_{1,j})$ v $(d_{1,j}$ XOR $d_{2,j})$ v ... v $(d_{q-2,j}$ XOR $d_{q-1,j})=(111 ... 11)_2$ are satisfied, a fixed S-box table before masking is defined as S[x], and i-th masked fixed S-box table is defined as $S_{j,h}[x]=$ S[x XOR $c_{h,j}$] XOR $d_{h,j}$ for the j-th fixed value, where i is an integer;

a selector for selecting one of said q sets of fixed S-box tables in response to the random number h, said nonlinear transform means nonlinearly transforming an input thereto in accordance with said selected set of fixed S-box tables; and a plurality of encrypting rounds, wherein i-th one of said plurality of encrypting rounds comprises the XOR means, the fixed S-box tables, the selector, linear transform means $L1_i(x)$ and linear transform means $L2_i(x)$, for that round, and wherein the fixed S-box tables for said plurality of respective encrypting rounds are identical, and wherein the linear transform means $L1_i(x)$, the nonlinear transform means with the masked fixed S-box table $S_{j,h}[x]$ and the linear transform means $L2_i(x)$ operate in that round.

14. The encryption device according to claim 13, characterized in that the linear transform means $L1_i(x)$ is defined as $L1_i(x)=x$.

15. The encryption device according to claim 13, characterized in that the linear transform means $L2_i(x)$ is defined as $L2_i(x)=$MixedColumn(Shift(x)).

16. The encryption device according to claim 13, characterized in that the linear transform means $L2_i(x)$ is defined as Shift(x).

17. An encryption device comprising a random number generator for generating a random number h, where h is an integer between zero and q−1, and a first plurality of encrypting rounds, wherein i-th one of said plurality of encrypting rounds comprises nonlinear transform means for nonlinearly transforming an input thereto, and XOR means for XORing a first input thereto with a second input thereto for that round, where i is an integer;

the second input to said XOR means is coupled to an output of said nonlinear transform means; and said nonlinear transform means comprises:

q sets of fixed mask values $FM_{i,h}$, where q is an integer equal to three or more, wherein equations, $FM_{0,h}=C_h$XOR $L1_0$ ($FMin_h$), and $C_h=c_{h,15}c_{h,14} ... c_{h,0}$, are satisfied, where $FM_{i,h}$ is the i-th fixed value of the h-th set of said q sets of fixed mask values, where $FMin_h$ is a selected one of said fixed mask values, and, q sets of fixed S-box tables, wherein equations, $(c_{0,j}$ XOR $c_{1,j})$ v $(c_{1,j}$ XOR $c_{2,j})$ v ... v $(c_{q-2,j}$ XOR $c_{q-1,j})=$ $(111 ... 11)_2$ and $(d_{0,j}$ XOR $d_{1,j})$ v $(d_{1,j}$ XOR $d_{2,j})$ v ... v $(d_{q-2,j}$ XOR $d_{q-1,j})=(111 ... 11)_2$ are satisfied, a fixed S-box table before masking is defined as S[x], and i-th masked fixed S-box table is defined as $S_{j,h}[x]=$ S[x XOR $c_{h,j}$] XOR $d_{h,j}$ for the j-th fixed value, where j is an integer;

a selector for selecting one of said q sets of fixed mask values in response to the random number h;

further XOR means for XORing an input thereto with an XOR of a key with said selected fixed value;

linear transform means $L1_i(x)$;

a plurality of nonlinear transform means for nonlinearly transforming an input in accordance with a fixed S-box table;

linear transform means $L2_i(x)$, wherein the linear transform means $L1_i(x)$, the nonlinear transform means with the masked fixed S-box table $S_{j,h}[x]$ and the linear transform means $L2_i(x)$ operate in that round; and a selector for selecting one of said plurality of nonlinear transform means.

18. The encryption device according to claim 17, characterized in that the linear transform means $L1_i(x)$ is defined as $L1_i(x)=x$.

19. The encryption device according to claim 17, characterized in that the linear transform means $L2_i(x)$ is defined as $L2_i(x)=$MixedColumn(Shift(x)).

20. The encryption device according to claim 17, characterized in that the linear transform means $L2_i(x)$ is defined as Shift(x).

21. An encryption device comprising a random number generator for generating a random number h, where h is an integer between zero and q−1, and a first plurality of encrypting rounds, wherein i-th one of said plurality of encrypting rounds comprises nonlinear transform means for nonlinearly transforming an input thereto, and XOR means for XORing a first input thereto with a second input thereto for that round, where i is an integer;

the second input to said XOR means is coupled to an output of said nonlinear transform means; and said nonlinear transform means comprises:

q sets of fixed mask values $FM_{i,h}$, where q is an integer equal to three or more, wherein equations $FM_{i,h} = C_h \text{XOR } L1i(L2i-1(D_h))$ for $i \geq 1$, $C_h = c_{h,15}c_{h,14} \ldots c_{h,0}$, and $D_h = d_{h,15}d_{h,14} \ldots d_{h,0}$, are satisfied, where $FM_{i,h}$ is the i-th fixed value of the h-th set of said q sets of fixed mask values, q sets of fixed S-box tables, wherein equations $(c_{0,j} \text{ XOR } c_{1,j}) \vee (c_{1,j} \text{ XOR } c_{2,j}) \vee \ldots \vee (c_{q-2,j} \text{ XOR } c_{q-1,j}) = (111 \ldots 11)_2$ and $(d_{0,j} \text{ XOR } d_{1,j}) \vee (d_{1,j} \text{ XOR } d_{2,j}) \vee \ldots \vee (d_{q-2,j} \text{ XOR } d_{q-1,j}) = (111 \ldots 11)_2$ are satisfied, a fixed S-box table before masking is defined as $S[x]$, and i-th masked fixed S-box table is defined as $S_{j,h}[x] = S[x \text{ XOR } c_{h,j}] \text{ XOR } d_{h,j}$ for the j-th fixed value, where j is an integer;

a selector for selecting one of said q sets of fixed mask values in response to the random number h;

further XOR means for XORing an input thereto with an XOR of a key with said selected fixed value;

linear transform means $L1_i(x)$;

a plurality of nonlinear transform means for nonlinearly transforming an input in accordance with a fixed S-box table;

linear transform means $L2_i(x)$, wherein the linear transform means $L1_i(x)$, the nonlinear transform means with the masked fixed S-box table $S_{j,h}[x]$ and the linear transform means $L2_i(x)$ operate in that round; and a selector for selecting one of said plurality of nonlinear transform means.

22. The encryption device according to claim 21, characterized in that the linear transform means $L1_i(x)$ is defined as $L1_i(x) = x$.

23. The encryption device according to claim 21, characterized in that the linear transform means $L2_i(x)$ is defined as $L2_i(x) = \text{MixedColumn}(\text{Shift}(x))$.

24. The encryption device according to claim 21, characterized in that the linear transform means $L2_i(x)$ is defined as $\text{Shift}(x)$.

25. A program stored on a computer or machine-readable storage medium for use in an encryption device, said program operable to effect the steps of:

selecting one set of q sets of fixed mask values $FM_{i,h}$, where q is an integer equal to three or more, in response to a random number h, where h is an integer between zero and q−1;

XORing an input value with an XOR of a key with said selected fixed value in i-th one of rounds, wherein equations, $FM_{0,h} = C_h \text{XOR } L1_0 (FMin_h)$ and $C_h = c_{h,15}c_{h,14} \ldots c_{h,0}$, are satisfied, where $FM_{i,h}$ is the i-th fixed value of the h-th set of said q sets of fixed mask values, where $FMin_h$ is a selected one of said fixed mask values and where i is an integer;

selecting one set $S_{j,h}[x]$ of q sets of masked fixed S-box tables in response to the random number h in that round, wherein equations, $(c_{0,j} \text{ XOR } c_{1,j}) \vee (c_{1,j} \text{ XOR } c_{2,j}) \vee \ldots \vee (c_{q-2,j} \text{XOR } c_{q-1,j}) = (111 \ldots 11)_2$ and $(d_{0,j} \text{ XOR } d_{1,j}) \vee (d_{1,j} \text{ XOR } d_{2,j}) \vee \ldots \vee (d_{q-2,j} \text{ XOR } d_{q-1,j}) = (111 \ldots 11)_2$ are satisfied, a fixed S-box table before masking is defined as $S[x]$, and i-th masked fixed S-box table is defined as $S_{j,h} = S[x \text{ XOR } c_{h,j}] \text{ XOR } d_{h,j}$ for the j-th fixed value, where j is an integer;

nonlinearly transforming an input value in accordance with said selected set $S_{j,h}[x]$ of fixed S-box tables in that round; and linearly transforming an input value and the nonlinearly transformed value in that round.

* * * * *